(12) United States Patent
Lee et al.

(10) Patent No.: US 12,548,168 B2
(45) Date of Patent: Feb. 10, 2026

(54) SYSTEMS AND METHODS FOR OBJECT TRACKING

(71) Applicant: ADOBE INC., San Jose, CA (US)

(72) Inventors: Joon-Young Lee, San Jose, CA (US); Seoungwug Oh, San Jose, CA (US); Sanghyun Woo, Daejeon (KR); Kwanyong Park, Daejeon (KR)

(73) Assignee: ADOBE INC., San Jose, CA (US)

( * ) Notice: Subject to any disclaimer, the term of this patent is extended or adjusted under 35 U.S.C. 154(b) by 562 days.

(21) Appl. No.: 17/657,430

(22) Filed: Mar. 31, 2022

(65) Prior Publication Data

US 2023/0316536 A1 Oct. 5, 2023

(51) Int. Cl.
*G06T 7/20* (2017.01)
*G06N 3/045* (2023.01)
*G06N 3/0464* (2023.01)
*G06N 3/09* (2023.01)
*G06N 3/096* (2023.01)
(Continued)

(52) U.S. Cl.
CPC ............ *G06T 7/20* (2013.01); *G06N 3/045* (2023.01); *G06T 3/02* (2024.01); *G06T 3/40* (2013.01); *G06V 10/764* (2022.01); *G06V 10/774* (2022.01); *G06V 10/776* (2022.01); *G06V 10/82* (2022.01); *G06T 2207/10016* (2013.01); *G06T 2207/20081* (2013.01); *G06T 2207/20084* (2013.01); *G06T 2207/20132* (2013.01); *G06T 2207/20212* (2013.01); *G06V 2201/07* (2022.01)

(58) Field of Classification Search
None
See application file for complete search history.

(56) References Cited

U.S. PATENT DOCUMENTS

2019/0325584 A1* 10/2019 Peled ................. G06N 3/08
2020/0272905 A1* 8/2020 Saripalli ............. G06N 3/082
(Continued)

FOREIGN PATENT DOCUMENTS

CN 113393494 A * 9/2021
WO WO-2020232069 A1 * 11/2020 ............ G06N 3/084

OTHER PUBLICATIONS

Park, Eunbyung, and Alexander C. Berg. "Meta-tracker: Fast and robust online adaptation for visual object trackers." Proceedings of the European Conference on Computer Vision (ECCV). 2018. (Year: 2018).*

(Continued)

*Primary Examiner* — Ross Varndell
*Assistant Examiner* — Nhut Huy Pham
(74) *Attorney, Agent, or Firm* — F. CHAU & ASSOCIATES, LLC

(57) ABSTRACT

Systems and methods for object tracking are described. One or more aspects of the systems and methods include receiving a video depicting an object; generating object tracking information for the object using a student network, wherein the student network is trained in a second training phase based on a teacher network using an object tracking training set and a knowledge distillation loss that is based on an output of the student network and the teacher network, and wherein the teacher network is trained in a first training phase using an object detection training set that is augmented with object tracking supervision data; and transmitting the object tracking information in response to receiving the video.

18 Claims, 14 Drawing Sheets

(51) Int. Cl.
G06T 3/02 (2024.01)
G06T 3/40 (2006.01)
G06V 10/764 (2022.01)
G06V 10/774 (2022.01)
G06V 10/776 (2022.01)
G06V 10/82 (2022.01)

(56) References Cited

U.S. PATENT DOCUMENTS

2021/0248885 A1* 8/2021 Huang .................. G06F 18/253
2022/0083783 A1* 3/2022 Subramanian .......... G06T 7/246
2023/0206466 A1* 6/2023 Todoran ................. G06T 7/207
382/103

OTHER PUBLICATIONS

Xiang Zhang, Understanding Mask R-CNN Basic Architecture, ShuffleAI.blog, 2021 (Year: 2021).*
Xie, Qizhe, et al. "Self-training with noisy student improves imagenet classification." Proceedings of the IEEE/CVF conference on computer vision and pattern recognition. 2020. (Year: 2020).*
Wang, Zihao, et al. "An Image Augmentation Method Based on Limited Samples for Object Tracking Based on Mobile Platform." Sensors 22.5 (2022): 1967. (Year: 2022).*
Zhang, "Understanding Mask R-CNN Basic Architecture", ShuffleAI. blog, published Nov. 14, 2021.*
Park et al, "Meta-tracker: Fast and robust online adaptation for visual object trackers." Proceedings of the European Conference on Computer Vision (ECCV), published 2018.*
Wang et al, "An Image Augmentation Method Based on Limited Samples for Object Tracking Based on Mobile Platform." Sensors 22.5 (2022): 1967, published Mar. 2, 2022.*
Bochkovskiy, et al., "Yolov4: Optimal Speed and Accuracy of Object Detection", arXiv preprint arXiv:2004.10934v1 [cs.CV] Apr. 23, 2020, 17 pages.
Dave, et al., "TAO: A Large-Scale Benchmark for Tracking Any Object", arXiv preprint arXiv:2005.10356v1 [cs.CV] May 20, 2020, 32 pages.
Ghiasi, et al., "Simple Copy-Paste is a Strong Data Augmentation Method for Instance Segmentation", arXiv preprint arXiv:2012. 07177v2 [cs.CV] Jun. 23, 2021, 13 pages.
Gupta, et al., "LVIS: A Dataset for Large Vocabulary Instance Segmentation", arXiv:1908.03195v2 [cs.CV] Sep. 15, 2019, 13 pages.
He, et al., "Mask R-CNN", arXiv preprint arXiv:1703.06870v3 [cs.CV] Jan. 24, 2018, 12 pages.
Hinton, et al., "Distilling the Knowledge in a Neural Network", arXiv preprint arXiv:1503.02531v1 [stat.ML] Mar. 9, 2015, 9 pages.
Kim, et al., "Video Panoptic Segmentation", arXiv preprint arXiv:2006. 11339v1 [cs.CV] Jun. 19, 2020, 12 pages.
Leal-Taixe, et al., "Tracking the Trackers: An Analysis of the State of the Art in Multiple Object Tracking", arXiv preprint arXiv:1704. 02781v1 [cs.CV] Apr. 10, 2017, 18 pages.
Lin, et al., "Feature Pyramid Networks for Object Detection", arXiv preprint arXiv:1612.03144v2 [cs.CV] Apr. 19, 2017, 10 pages.
McCloskey, et al., "Catastrophic Interference in Connectionist Networks: The Sequential Learning Problem", In Psychology of Learning and Motivation, vol. 24, 1989, pp. 109-165, Available at https://www.sciencedirect.com/science/article/abs/pii/S0079742108605368.
Pang, et al., "Quasi-Dense Similarity Learning for Multiple Object Tracking", arXiv preprint arXiv:2006.06664v4 [cs.CV] Sep. 8, 2021, 16 pages.
Ren, et al., "Faster R-CNN: Towards Real-Time Object Detection with Region Proposal Networks", arXiv preprint arXiv:1506. 01497v3 [cs.CV] Jan. 6, 2016, 14 pages.
Son, et al., "Multi-Object Tracking with Quadruplet Convolutional Neural Networks", In CVPR, pp. 5620-5629, 2017, 10 pages.
Tan, et al., "Equalization Loss v2: A New Gradient Balance Approach for Long-Tailed Object Detection", arXiv preprint arXiv:2012. 08548v2 [cs.CV] Apr. 1, 2021, 11 pages.
Wang, et al., "Seesaw Loss for Long-Tailed Instance Segmentation", arXiv preprint arXiv:2008.10032v4 [cs.CV] Jun. 17, 2021, 13 pages.
Xie, et al., "Self-training with Noisy Student improves ImageNet classification", arXiv preprint arXiv:1911.04252v4 [cs.LG] Jun. 19, 2020, 18 pages.
Yang, et al., "Video Instance Segmentation", arXiv preprint arXiv:1905. 04804v4 [cs.CV] Aug. 16, 2019, 10 pages.
Yun, et al., "CutMix: Regularization Strategy to Train Strong Classifiers with Localizable Features", arXiv preprint arXiv:1905. 04899v2 [cs.CV] Aug. 7, 2019, 14 pages.
Zheng, et al., "Learning to Track Objects from Unlabeled Videos", arXiv preprint arXiv:2108.12711v1 [cs.CV] Aug. 28, 2021, 10 pages.
Zhou, et al., "Probabilistic two-stage detection", arXiv preprint arXiv:2103.07461v1 [cs.CV] Mar. 12, 2021, 13 pages.
Oh, et al., "Video Object Segmentation using Space-Time Memory Networks", arXiv preprint arXiv:1904.00607v2 [cs.CV] Aug. 12, 2019, 10 pages.
Sio, et al., "S2SiamFC: Self-supervised Fully Convolutional Siamese Network for Visual Tracking", In Proceedings of ACM International Conference on Multimedia, pp. 1948-1957, 2020, Available at https://dl.acm.org/doi/10.1145/3394171.3413611.

* cited by examiner

SYSTEMS AND METHODS FOR OBJECT TRACKING

BACKGROUND

The following relates generally to computer vision, and more specifically to object tracking. Computer vision is a field of artificial intelligence in which computers attempt to understand aspects of images or videos. For example, computer vision tasks include acquiring, processing, and analyzing images and videos, and making an appropriate decision in response to information acquired from the images and videos. Computer vision techniques include object detection, in which a computer detects classes of objects in an image or video, and object tracking, in which a computer locates a moving object over time in a video.

Existing object detection training sets lack the supervision that enable training a tracking network, and existing tracking training sets lack detection supervisions that are present in the object detection training sets. This may lead to catastrophic forgetting when a machine learning model attempts to use both training sets. Therefore there is need in the art for a machine learning apparatus that is able to perform object tracking after being trained using existing object tracking training sets and object detection training sets while avoiding catastrophic forgetting of information learning from the object detection training set.

SUMMARY

A method, apparatus, non-transitory computer readable medium, and system for object tracking are described. One or more aspects of the method, apparatus, non-transitory computer readable medium, and system include augmenting an object detection training set with modified versions of images from the object detection training set to obtain an augmented training set; training a teacher network to perform object tracking in a first training phase using the augmented training set; and training a student network to perform object tracking in a second training phase using an object tracking training set, wherein the student network is trained based on a knowledge distillation loss that is based on an output of the student network and an output of the teacher network.

A method, apparatus, non-transitory computer readable medium, and system for object tracking are described. One or more aspects of the method, apparatus, non-transitory computer readable medium, and system include receiving a video depicting an object; generating object tracking information for the object using a student network, wherein the student network is trained in a second training phase based on a teacher network using an object tracking training set and a knowledge distillation loss that is based on an output of the student network and the teacher network, and wherein the teacher network is trained in a first training phase using an object detection training set that is augmented with object tracking supervision data; and transmitting the object tracking information in response to receiving the video.

An apparatus and system for object tracking are described. One or more aspects of the apparatus and system include a data augmentation component configured to augment an object detection training set with modified images from the object detection training set to obtain an augmented training set; a teacher network trained to perform object tracking in a first training phase using the augmented training set; and a student network trained to perform object tracking in a second training phase using an object tracking training set, wherein the student network is trained based on a knowledge distillation loss that is based on an output of the student network and an output of the teacher network.

DETAILED DESCRIPTION

Figure 1:
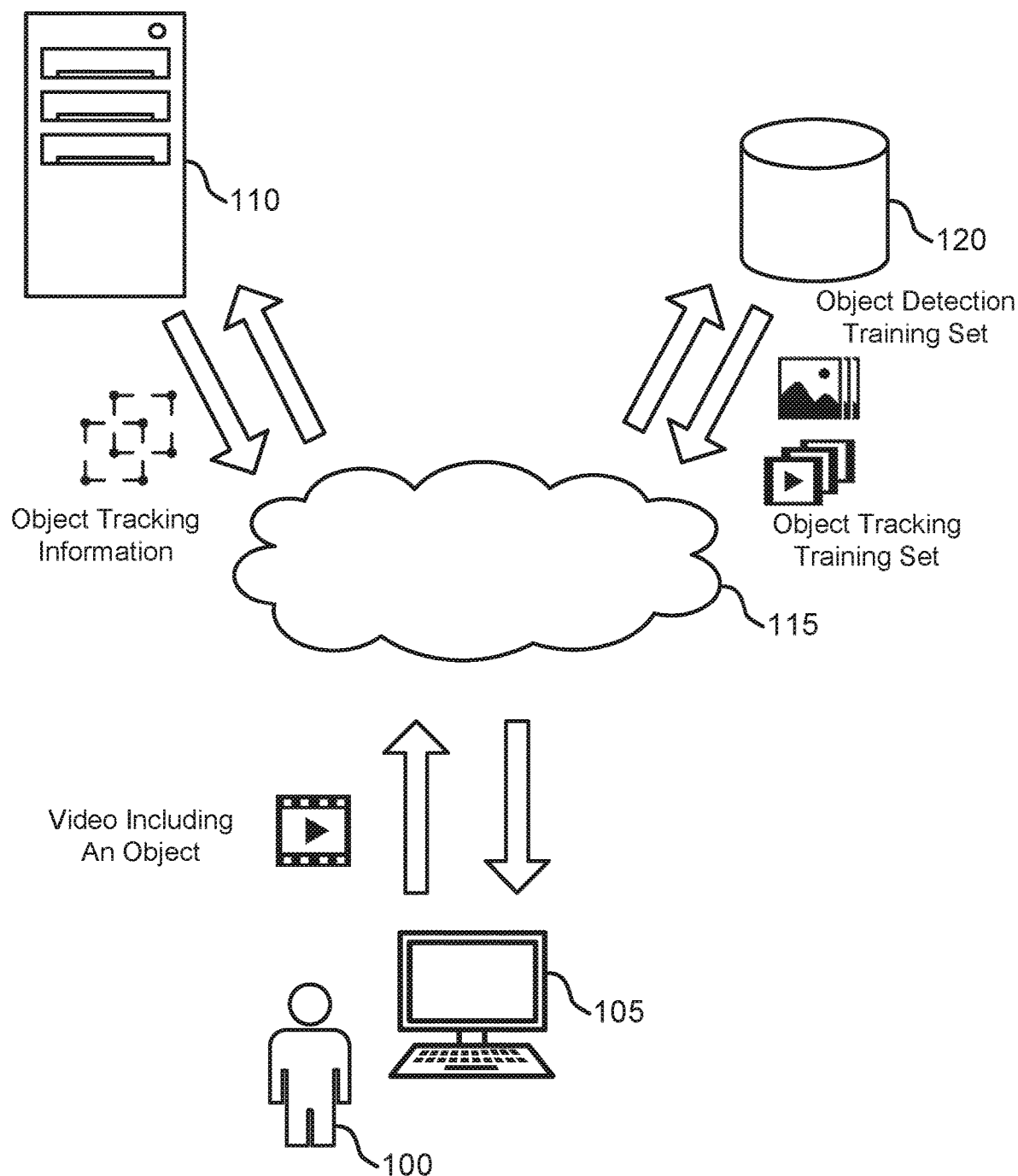
FIG. 1 shows an example of an object tracking system according to aspects of the present disclosure.

Computer vision is a field of artificial intelligence in which computers attempt to understand aspects of images or videos. Object detection, in which a computer detects classes of objects in an image or video, and video tracking, a subset of object tracking in which a computer locates a moving object over time in a video, are two applications of computer vision techniques. An object tracking system may benefit from being jointly trained on both an object detection training set and an object tracking training set, as the number of object classifications (the vocabulary) are larger in object detection training sets, which would potentially allow an object tracker to recognize more objects than if it was trained on an object tracking training set alone.

However, existing object detection training sets lack necessary tracking supervisions, leading to inconsistent learning of detection and tracking in a joint-training regime, resulting in sub-optimal video feature representations. Furthermore, existing tracking training sets lack detection supervisions that are present in the object detection training sets, which may lead to catastrophic forgetting of information learned from the object detection training set when a machine learning model attempts to use both training sets in a naïve training approach. Therefore there is need in the art for a machine learning apparatus that may successfully perform object tracking after being jointly trained based on existing object tracking training sets and object detection training sets.

The present disclosure provides systems and methods for object tracking. At least one embodiment of the present disclosure receive a video depicting an object; generate object tracking information for the object using a student network, where the student network is trained in a second training phase based on a teacher network using an object tracking training set and a knowledge distillation loss that is based on an output of the student network and the teacher network, and where the teacher network is trained in a first training phase using an object detection training set that is augmented with object tracking supervision data; and transmit the object tracking information in response to receiving the video.

According to at least one embodiment, a machine learning apparatus hallucinates missing tracking supervisions in an object detection training set by generating modified versions of the original images in the object detection training set to approximate movement of objects from one frame of a video to another. In at least one embodiment, the modified images are generated using an image scaling approach. In at least one embodiment, the modified images are generated using an image mosaicing approach. Because the machine learning model knows the spatial and classification relationships between the objects in the original image and the corresponding modified image, the machine learning model is able to add tracking supervisions to the object detection training set, allowing the object detection training set to be more effectively used in training a tracking network.

According to at least one embodiment, the machine learning apparatus avoids catastrophic forgetting in a detection network when training the detection network with an object tracking training set by implementing a student-teacher network framework in which a student network is initialized with the parameters of a teacher network. The teacher network is trained to perform object detection and object tracking in a first training phase, and is then frozen so that it is not further trained. The student network is trained to perform object detection during a second training phase, and is also trained to perform object tracking using an object tracking training set based on a knowledge distillation loss that is computed using outputs of the student network and the teacher network. Additionally, in at least one embodiment, the teacher network generates missing labels in the object tracking training set by using a pseudo-labeling process, and the knowledge distillation loss is based on the generated pseudo-labels. Therefore, unlike conventional object tracking systems and methods, the student-teacher framework allows the machine learning apparatus to jointly train for both object detection tasks and object tracking tasks using an object tracking training set that initially does not include labels that are present in the object detection training set while avoiding catastrophic forgetting.

According to at least one embodiment, the machine learning apparatus mitigates semantic flickering between bounding boxes in object tracking information by training a machine learning model using a temporal consistency loss that enforces outputs of the machine learning model for corresponding video frames to be consistent, where class predictions of the same instances in two different frames are forced to be equivalent.

Accordingly, at least one embodiment of the present disclosure provides a strong video tracker by allowing for the use of both large-vocabulary detection and training sets to jointly train the tracker. Conventional object tracking systems and methods may use transformer-based architectures to attempt to jointly train a detector and a tracker. However, the conventional object tracking systems may only focus on a few object categories, such as people or vehicles, while ignoring most other objects. In contrast, aspects of the present disclosure build upon a tracking-by-detection paradigm. In at least one aspect, the machine learning model adopts lightweight embedding heads for detection and tracking, respectively, where tracking is learned through a dense matching between quasi-dense samples on a pair of images and is optimized with multiple positive contrastive learning.

Aspects of the present disclosure are used in a video processing context. For example, a user provides a video to the machine learning apparatus so that the machine learning apparatus annotates the video with object tracking information. Because the machine learning apparatus is jointly trained using an object detection training set and an object tracking training set, the machine learning apparatus is able to provide object tracking information that classifies a greater variety of objects than conventional object tracking systems and methods.

Figure 3:
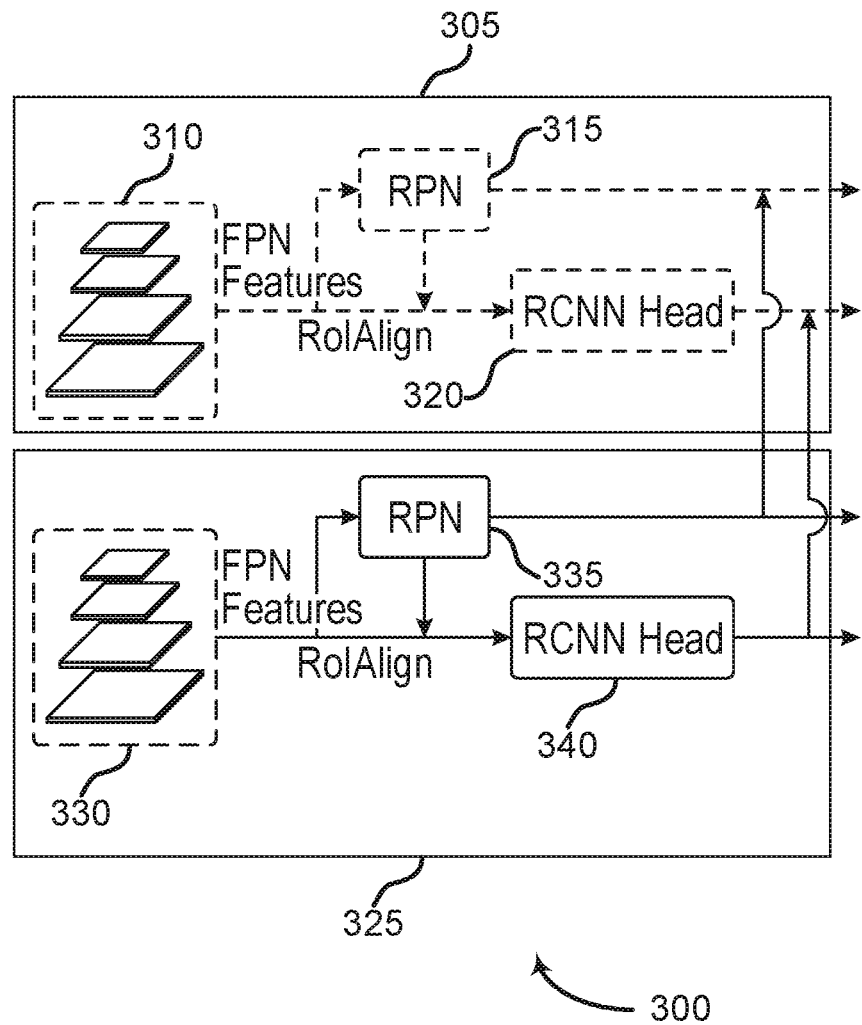
FIG. 3 shows an example of a machine learning model according to aspects of the present disclosure.
Figure 4:
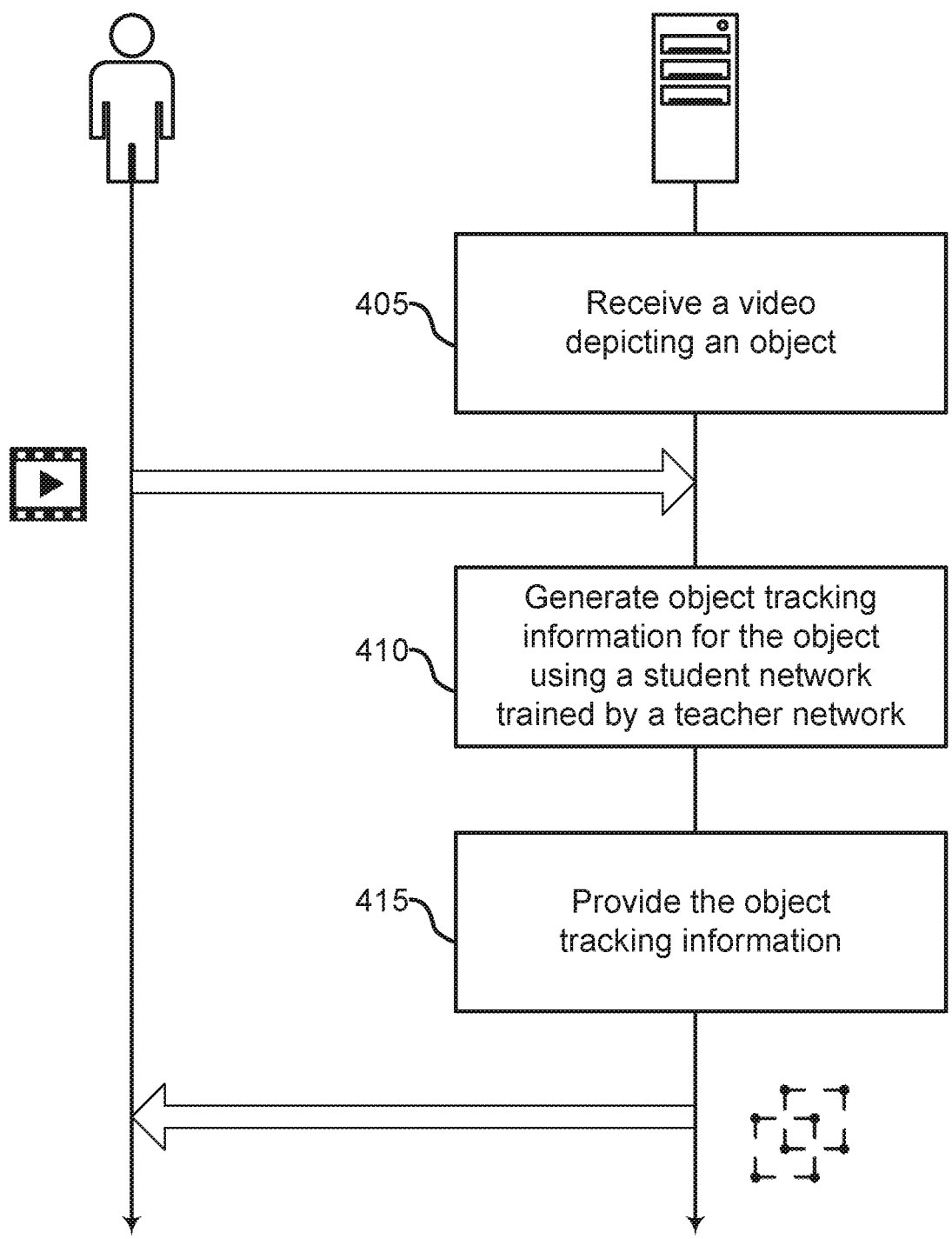
FIG. 4 shows an example providing object tracking information according to aspects of the present disclosure.

An example application of the present disclosure in the video processing context is provided with reference to FIG. 4. Example processes for object tracking are provided with reference to FIG. 5. Details regarding the architecture of an example machine learning apparatus are provided with reference to FIGS. 1-3. Example processes for training a machine learning model are provided with reference to FIGS. 6-14.

Object Tracking System

Figure 2:
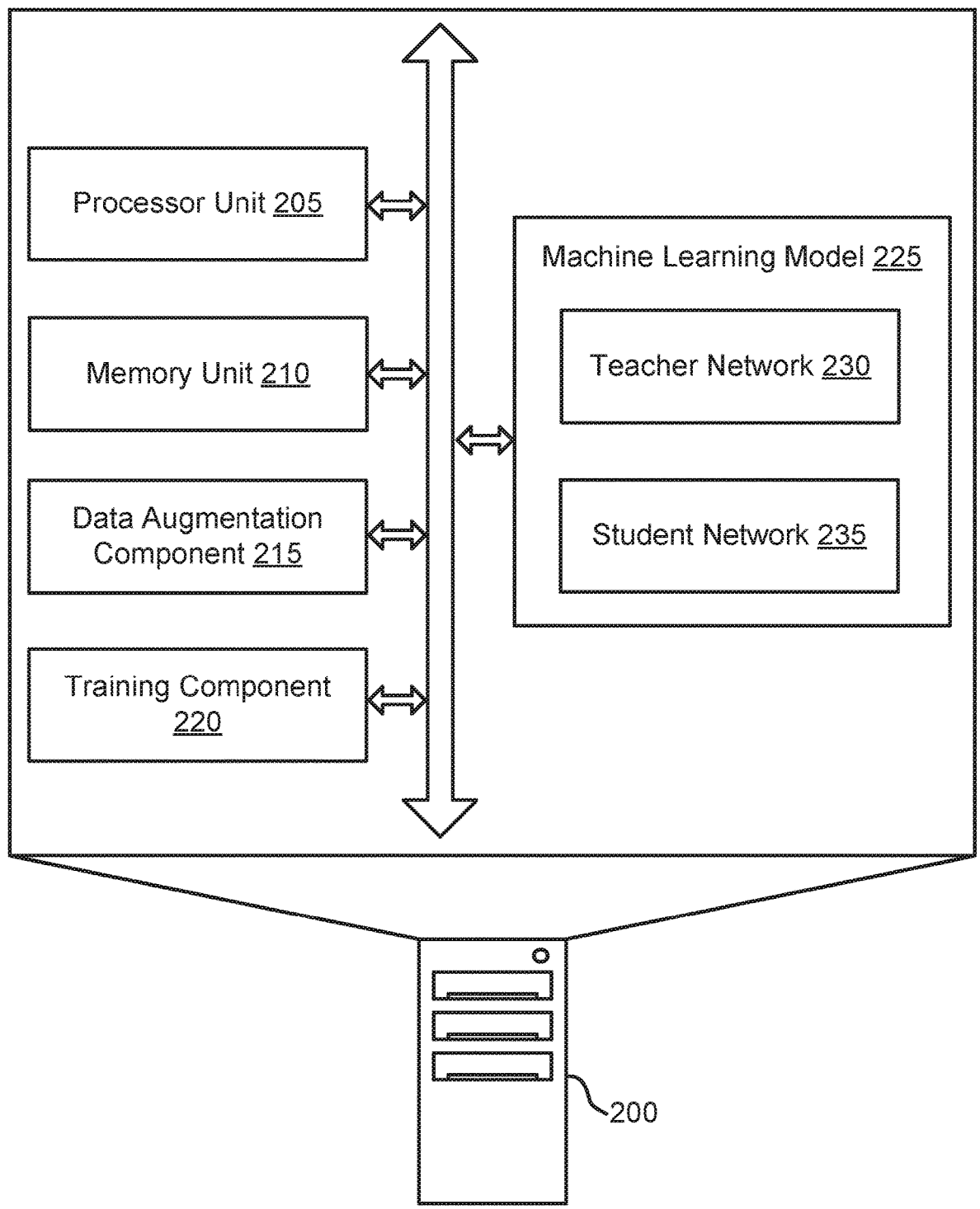
FIG. 2 shows an example of a machine learning apparatus according to aspects of the present disclosure.

In FIGS. 1-3, a system and an apparatus for object tracking is described. One or more aspects of the system and apparatus include a data augmentation component configured to augment an object detection training set with modified images from the object detection training set to obtain an augmented training set; a teacher network trained to perform object tracking in a first training phase using the augmented training set; and a student network trained to perform object tracking in a second training phase using an object tracking training set, wherein the student network is trained based on a knowledge distillation loss that is based on an output of the student network and an output of the teacher network.

Some examples of the system and apparatus further include a training component configured to train the teacher network and the student network. In some aspects, the data augmentation component is configured to augment the object tracking training set based on pseudo-labels generated by the teacher network.

In some aspects, the teacher network and the student network each include a feature pyramid network, a region proposal network, and a refinement network. In some aspects, the refinement network includes an RCNN.

FIG. 1 shows an example of an object tracking system according to aspects of the present disclosure. The example shown includes user 100, user device 105, machine learning apparatus 110, cloud 115, and database 120.

Referring to FIG. 1, user 100 provides a video to machine learning apparatus 110 via user device 105 and cloud 115. Machine learning apparatus 110 is jointly trained to perform object detection and object tracking using an object detection training set and an object tracking training set retrieved from database 120 via cloud 115. Machine learning apparatus 110 receives the video and performs object tracking on the video to generate object tracking information. In some embodiments, the object tracking information includes bounding boxes and labels that locate and describe particular objects depicted in the video and track the movement of the object over time across video frames. In some aspects, because machine learning apparatus 110 is jointly trained using a teacher-student network framework, machine learning apparatus 110 is able retain information learned from the object detection training set and is therefore able to identify a greater variety of objects in the video than if it had been trained solely on the object tracking training set. Machine learning apparatus 110 then provides an annotated video including the object tracking information to user 100 via user device 105 and cloud 115.

In some embodiments, user device 105 is a personal computer, laptop computer, mainframe computer, palmtop computer, personal assistant, mobile device, or any other suitable processing apparatus. In some examples, user device 105 includes software that can send and receive information such as videos and images to machine learning apparatus 110, and can display the video and images.

In some embodiments, a user interface enables user 100 to interact with user device 105. In some embodiments, the user interface includes an audio device, such as an external speaker system, an external display device such as a display screen, or an input device (e.g., a remote control device interfaced with the user interface directly or through an IO controller module). In some cases, the user interface is a graphical user interface (GUI).

In some embodiments, machine learning apparatus 110 includes a computer implemented network that includes a machine learning model including one or more neural networks. In some embodiments, machine learning apparatus 110 also includes one or more processors, a memory subsystem, a communication interface, an I/O interface, one or more user interface components, and a bus. Additionally, in some embodiments, machine learning apparatus 110 communicates with user device 105 and database 120 via cloud 115.

In some cases, machine learning apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Further detail regarding the architecture of machine learning apparatus 110 is provided with reference to FIGS. 2-3. Further detail regarding a process for generating object tracking information using machine learning apparatus 110 is described with reference to FIGS. 4-5. Further detail regarding training a machine learning model of machine learning apparatus 110 is provided with reference to FIGS. 6-14. Machine learning apparatus 110 is an example of, or includes aspects of, the corresponding element described with reference to FIG. 2.

A cloud such as cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. In some aspects, cloud 115 provides communications between user device 105, machine learning apparatus 110, and database 120.

A database such as database 120 is an organized collection of data. For example, database 120 stores data in a specified format known as a schema. In some embodiments, database 120 is structured as a single database, a distributed database, multiple distributed databases, or an emergency backup database. In some embodiments, a database controller manages data storage and processing in database 120. In some cases, user 100 interacts with the database controller. In other cases, the database controller operates automatically without user interaction. In some cases, database 120 stores an object detection training set and an object tracking training set. In some cases, database 120 stores information provided from components of machine learning apparatus 110, such as an augmented training set, relationships between original images and modified versions of the original images, region proposal information, classification information, and bounding box information, and provides the stored information to components of machine learning apparatus 110. In some cases, database 120 stores images and/or videos to be annotated by machine learning apparatus 110, and machine learning apparatus 110 may retrieve the images and/or videos from database 120, annotate them, and return the annotated images and/or videos to database 120.

FIG. 2 shows an example of a machine learning apparatus according to aspects of the present disclosure. Machine learning apparatus 200 is an example of, or includes aspects of, the corresponding element described with reference to FIG. 1. In one aspect, machine learning apparatus 200 includes processor unit 205, memory unit 210, data augmentation component 215, training component 220, and machine learning model 225.

Processor unit 205 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk.

Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 contains, among other things, a basic input/output system (BIOS) which controls basic hardware or software operation such as the interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, data augmentation component 215 augments an object detection training set with modified versions of images from the object detection training set to obtain an augmented training set. In some examples, data augmentation component 215 scales an image of the object detection training set to obtain a scaled image, where the modified images include the scaled image. In some examples, data augmentation component 215 combines a set of images from the object detection training set to obtain a combined image, where the modified images include the combined image. In some examples, data augmentation component 215 performs an affine transformation on the combined image to obtain a transformed image. In some examples, data augmentation component 215 crops the transformed image to obtain a cropped image, where the modified images include the cropped image.

According to some aspects, data augmentation component 215 is configured to augment an object detection training set with modified images from the object detection training set to obtain an augmented training set. In some aspects, the data augmentation component 215 is configured to augment the object tracking training set based on pseudo-labels generated by the teacher network 230. Data augmentation component 215 is an example of, or includes aspects of, the corresponding element described with reference to FIGS. 9 and 10. According to some aspects, data augmentation component 215 is implemented as a hardware circuit, in firmware, or as a software component.

According to some aspects, training component 220 trains teacher network 230 to perform object tracking in a first training phase using the augmented training set. In some examples, training component 220 trains student network 235 to perform object tracking in a second training phase using an object tracking training set, where student network 235 is trained based on a knowledge distillation loss that is based on an output of student network 235 and an output of teacher network 230. In some examples, training component 220 trains teacher network 230 to perform object detection in the first training phase. In some examples, training component 220 trains student network 235 to perform object detection in the second training phase. In some examples, training component 220 computes a temporal consistency loss based on the first bounding box information and the second bounding box information, where student network 235 is trained based on the temporal consistency loss. In some aspects, the object detection training set includes one or more object categories that are not included in the object tracking training set.

According to some aspects, training component 220 is configured to train teacher network 230 and student network 235. Machine learning model 225 is an example of, or includes aspects of, the corresponding element described with reference to FIG. 3. According to some aspects, training component 220 is implemented as a hardware circuit, in firmware, or as a software component.

According to some aspects, machine learning model 225 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some aspects, machine learning model 225 includes teacher network 230 and student network 235. In some aspects, each of teacher network 230 and student network 235 includes one or more ANNs.

According to some aspects, teacher network 230 performs object detection on images from the object tracking training set to obtain pseudo-labels for the object tracking training set, where the knowledge distillation loss is based on the pseudo-labels.

In some examples, teacher network 230 computes first region proposal information using a region proposal network of teacher network 230. In some examples, teacher network 230 computes first classification information using the region proposal network. In some examples, teacher network 230 computes first bounding box information using a refinement network of teacher network 230. In some examples, teacher network 230 computes first classification information using the refinement network.

According to some aspects, teacher network 230 is trained to perform object tracking in a first training phase using the augmented training set. In some aspects, teacher network 230 and student network 235 each include a feature pyramid network, a region proposal network, and a refinement network. In some aspects, the refinement network includes an RCNN. Teacher network 230 is an example of, or includes aspects of, the corresponding element described with reference to FIGS. 3 and 11.

According to some aspects, student network 235 computes second region proposal information using a region proposal network of the student network 235, where the knowledge distillation loss is based on the first region proposal information and the second region proposal information. In some examples, student network 235 computes second classification information using the region proposal network, where the knowledge distillation loss is based upon the first classification information and the second classification information.

In some examples, student network 235 computes second bounding box information using a refinement network of the student network 235, where the knowledge distillation loss is based on the first bounding box information and the second bounding box information. In some examples, student network 235 computes second classification information using the refinement network, where the knowledge distillation loss is based upon the first classification information and the second classification information.

In some examples, student network 235 computes first bounding box information for a first frame of a video using the refinement network. In some examples, student network 235 computes second bounding box information for a second frame of the video using the refinement network.

According to some aspects, student network 235 receives a video depicting an object. In some examples, student network 235 generates object tracking information for the object, where student network 235 is trained in a second training phase based on teacher network 230 using an object tracking training set and a knowledge distillation loss that is based on an output of student network 235 and teacher network 230, and where teacher network 230 is trained in a first training phase using an object detection training set that is augmented with object tracking supervision data. In some examples, student network 235 transmits the object tracking information in response to receiving the video. In some aspects, the object tracking information includes classification information that categorizes the object according to a category that is not labeled in the object tracking training set.

According to some aspects, student network 235 is trained to perform object tracking in a second training phase using an object tracking training set, wherein student network 235 is trained based on a knowledge distillation loss that is based on an output of student network 235 and an output of the teacher network 230. According to some aspects, machine learning model 225 initializes student network 235 using parameters of teacher network 230. Student network 235 is an example of, or includes aspects of, the corresponding element described with reference to FIG. 3.

FIG. 3 shows an example of a machine learning model 300 according to aspects of the present disclosure. Machine learning model 300 is an example of, or includes aspects of, the corresponding element described with reference to FIG. 2. In one aspect, machine learning model 300 includes teacher network 305 and student network 325.

Referring to FIG. 3, in some aspects, teacher network 305 and student network 325 respectively include feature pyramid networks 310, region proposal networks 315, and refinement networks 320. In some aspects, refinement networks 320 each include an RCNN.

Feature pyramid networks (FPNs) such as feature pyramid networks 310 are a neural network architecture for building feature pyramids in a convolutional network (CNN). A CNN is a class of neural network that is commonly used in computer vision or image classification systems. In some cases, a CNN enables processing of digital images with minimal pre-processing. A CNN is characterized by the use of convolutional (or cross-correlational) hidden layers. These layers apply a convolution operation to the input before signaling the result to the next layer. Each convolutional node processes data for a limited field of input (i.e., the receptive field). During a forward pass of the CNN, filters at each layer are convolved across the input volume, computing the dot product between the filter and the input to output a feature map that is a mapping of where a certain kind of feature is found in the input. During the training process, the filters are modified so that they activate when they detect a particular feature within the input. In the computer vision context, the output of a CNN is a feature map that is a mapping of where a certain kind of feature is found in an image.

In an FPN, a bottom-up pathway implements a pyramid level that receives an input such as an image at an initial layer and outputs feature maps at each layer that are used as a reference set of feature maps for a top-down pathway by lateral connection in subsequent layers. The higher levels of the pyramid perform upsampling using a nearest neighbor function on output feature maps in a top-down manner, and each lateral connection merges feature maps of a same spatial size from a bottom-up pathway and a top-down pathway using element-wise addition. The FPN then appends a 3×3 convolution on each merged feature map to generate a final feature map that reduces an aliasing effect caused by the upsampling process.

In region proposal networks (RPNs) such as region proposal networks 315, a neural network including a classifier and a regressor is applied to an output convolutional feature map such as the feature map generated by an FPN by sliding a "window" over the feature map to propose regions of interest in the feature map that include object bounds for objects depicted in the image and objectness scores at each position. An objectness score measures how well a detector network identifies locations and classes of objects during detection. Each feature map goes through a convolution layer followed by two separate layers, one for objectness classification (to determine the probability of a proposal including a target object) and one for proposal regression (to regress coordinates of a proposal). An anchor is a central point of the sliding window, and anchors that meet a certain level of IoU overlap with ground-truth bounding boxes are assigned labels. The number of anchors that may be applied to an image depends on the aspect ratio and the scale (size) of the image and the number of anchors that are applied at each pixel (for example, nine). Therefore, in some cases, region proposal networks 315 pre-check which location in an image contains an object by outputting region proposal information including bounding boxes and corresponding locations. Referring to FIG. 3, according to some aspects, a knowledge distillation loss for training student network 325 is calculated by comparing the outputs of the region proposal networks 315.

In at least one embodiment, refinement networks 320 each include a CNN, two fully connected (FC) layers, and two separate FC layers, where one separate FC layer performs classification and the other separate FC layer performs bounding box regression. A fully connected layer is a function in which each output dimension depends on each input dimension. In some aspects, the CNN performs a region of interest (RoI) pooling operation such as RoIAlign to extract small feature maps from each proposed region, remove harsh quantization from the proposed regions by aligning extracted features with the input using bilinear interpolation at regularly sampled locations, and aggregating the results. In some aspects, each refinement network 320 takes the top-scoring proposals from respective region proposal networks 315 and performs RoI pooling to extract region features from each pyramid level. Each refinement network 320 then linearizes the respective input region features and feeds the linearized region features through the two FC layers and the two separate FC layers to output a softmax classification and a bounding box regression. This output may include the input image overlayed with bounding boxes that identify regions of classified objects in the image, a label for each bounding box describing the classification of the object in the bounding box, and a threshold for the classification label.

In at least one embodiment, each of the refinement networks 320 includes an RCNN. A standard CNN may not be suitable when the length of the output layer is variable, i.e., when the number of the objects of interest is not fixed. Selecting a large number of regions to analyze using conventional CNN techniques may result in computational inefficiencies. Thus, in the RCNN approach, a finite number of proposed regions are selected and analyzed.

In at least one embodiment, region proposal networks 315 and refinement networks 320 are respectively implemented as a Mask RCNN in each of teacher network 305 and student network 325. A Mask RCNN is a deep neural network incorporating concepts of the RCNN. Given an image as input, the Mask RCNN provides object bounding boxes, classes and masks (i.e., sets of pixels corresponding to object shapes). A Mask RCNN operates in two stages. First, it generates potential regions (i.e., bounding boxes) where an object might be found. Second, it identifies the class of the object, refines the bounding box and generates a pixel-level mask in pixel level of the object. These stages may be connected using a backbone structure such as feature pyramid networks 310. According to some aspects, the Mask RCNN is a Faster RCNN framework.

In at least one embodiment, student network 325 is initialized as an identical copy of teacher network 305. After an initial training, teacher network 305 and feature pyramid network 310 of student network 325 are frozen in order to retain knowledge of an object detection training set and guide the learning of student network 325 in a soft supervision processes when student network 325 is trained on an object tracking training set. Student network 325 can therefore adapt to the new object tracking domain with incoming video labels (via a detection loss) and also mimic the teacher network to preserve the past information via a knowledge distillation loss. The frozen model weights are indicated in FIG. 3 by dashed lines.

Teacher network 305 is an example of, or includes aspects of, the corresponding element described with reference to FIGS. 2 and 11. Student network 325 is an example of, or includes aspects of, the corresponding element described with reference to FIG. 2.

Object Tracking

Figure 5:
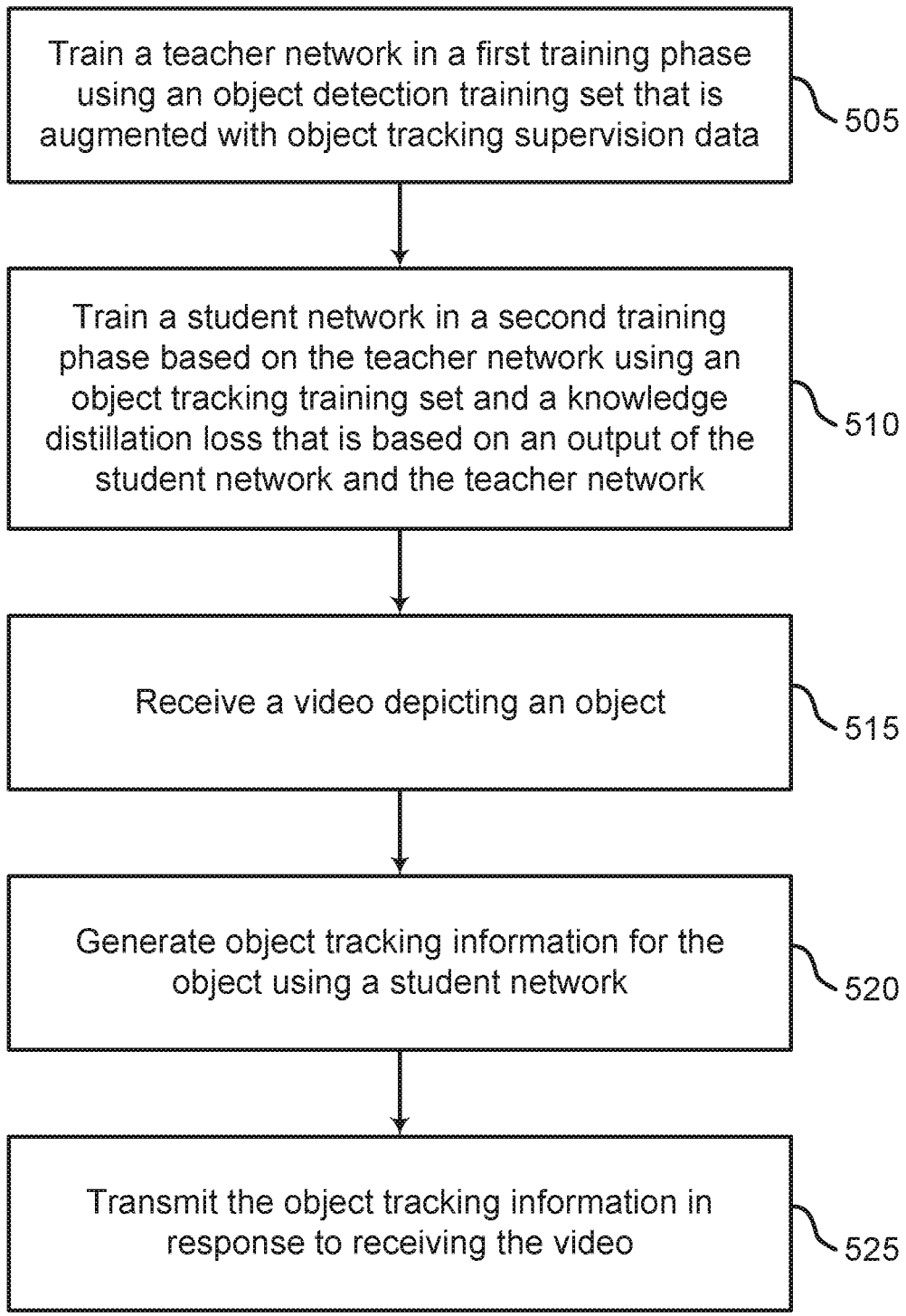
FIG. 5 shows an example generating object tracking information according to aspects of the present disclosure.

In FIGS. 4-5, a method for object tracking is described. One or more aspects of the method include receiving a video depicting an object; generating object tracking information for the object using a student network, wherein the student network is trained in a second training phase based on a teacher network using an object tracking training set and a knowledge distillation loss that is based on an output of the student network and the teacher network, and wherein the teacher network is trained in a first training phase using an object detection training set that is augmented with object tracking supervision data; and transmitting the object tracking information in response to receiving the video. In some aspects, the object tracking information includes classification information that categorizes the object according to a category that is not labeled in the object tracking training set.

FIG. 4 shows an example of providing object tracking information according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, aspects of the present disclosure are used in a video processing context. For example, a user wants to track the movement of objects in a video. For example, a person may appear at multiple positions across multiple frames in the video, and the user would like to identify the position of the person in each frame of the video. The user provides a machine learning apparatus with the video so that the machine learning apparatus annotates the video with object tracking information. According to some aspects, the machine learning apparatus is jointly trained using a teacher-student network framework, thereby retaining information learned from an object detection training set while also training on an object tracking training set, and is therefore able to identify a greater variety of objects in a video than if it had been trained solely on the object tracking training set.

At operation 405, the system receives a video depicting an object. In some cases, the operations of this step refer to, or may be performed by, a machine learning apparatus as described with reference to FIGS. 1 and 2. In an example, a user uploads the video to the machine learning apparatus via a user device and a cloud as described with reference to FIG. 1. In another example, the machine learning apparatus retrieves the video from a database as described with reference to FIG. 1.

At operation 410, the system generates object tracking information for the object using a student network trained by a teacher network. In some cases, the operations of this step refer to, or may be performed by, a machine learning apparatus as described with reference to FIGS. 1 and 2. In an example, the machine learning apparatus generates the object tracking information as described with reference to FIG. 5. In an example, the student network is trained as described with reference to FIG. 6.

At operation 415, the system provides the object tracking information. In some cases, the operations of this step refer to, or may be performed by, a machine learning apparatus as described with reference to FIGS. 1 and 2. In an example, the machine learning apparatus transmits to the user an annotated video that includes the original video and object tracking annotations, such as bounding boxes and labels, for one or more objects depicted in the video. In an example, the machine learning apparatus saves the annotated video in the database.

FIG. 5 shows an example of generating object tracking information according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a machine learning apparatus as describe with reference to FIG. 2 implements a teacher-student network framework as described with reference to FIG. 3 to train a student network to output object tracking information. The teacher-student network framework allows for the use of both an object detection training set and an object tracking training set in training the machine learning model while avoiding the catastrophic forgetting associated with the use of multiple datasets that include incompletely overlapping classification labels. The trained student network is thereby able to generate object tracking information that classifies a larger variety of objects than conventional object tracking systems and methods.

At operation 505, the system trains a teacher network in a first training phase using an object detection training set that is augmented with object tracking supervision data. In some cases, the operations of this step refer to, or may be performed by, a training component as described with reference to FIG. 2. In at least one aspect, the training component trains the teacher network in the first training phase using the object detection training set that is augmented with the object tracking supervision data as described with reference to FIG. 6.

At operation 510, the system trains a student network in a second training phase based on the teacher network using an object tracking training set and a knowledge distillation loss that is based on an output of the student network and the teacher network. In some cases, the operations of this step refer to, or may be performed by, a training component as described with reference to FIG. 2. In at least one aspect, the training component trains the student network in the second training phase based on the teacher network using the object tracking training set and the knowledge distillation loss that is based on the output of the student network and the teacher network as described with reference to FIG. 6.

At operation 515, the system receives a video depicting an object. In some cases, the operations of this step refer to, or may be performed by, a student network as described with reference to FIGS. 2 and 3. In an example, a user uploads the video to the machine learning apparatus via a user device and a cloud as described with reference to FIG. 1. In another example, the machine learning apparatus retrieves the video from a database as described with reference to FIG. 1.

At operation 520, the system generates object tracking information for the object using a student network. In some cases, the operations of this step refer to, or may be performed by, a student network as described with reference to FIGS. 2 and 3. In an example, the student network is a neural network that is trained to receive an input video, analyze the video, and output bounding box information and classification information for one or more objects depicted in the video. The bounding box indicates a region in each frame of the video where the object is detected, and the classification information labels the category that the object belongs to (e.g., person, dog, car, etc.).

At operation 525, the system transmits the object tracking information in response to receiving the video. In some cases, the operations of this step refer to, or may be performed by, a student network as described with reference to FIGS. 2 and 3. In an example, student network transmits to the user an annotated video that includes the original video and object tracking annotations, such as bounding boxes and labels, for one or more objects depicted in the video. In an example, the student network saves the annotated video in the database.

Training

In FIGS. 6-14, a method for object tracking is described. One or more aspects of the method include augmenting an object detection training set with modified versions of images from the object detection training set to obtain an augmented training set; training a teacher network to perform object tracking in a first training phase using the augmented training set; and training a student network to perform object tracking in a second training phase using an object tracking training set, wherein the student network is trained based on a knowledge distillation loss that is based on an output of the student network and an output of the teacher network. In some aspects, the object detection training set includes one or more object categories that are not included in the object tracking training set.

Some examples of the method further include training the teacher network to perform object detection in the first training phase. Some examples of the method further include training the student network to perform object detection in the second training phase. Some examples of the method further include initializing the student network using parameters from the teacher network.

Some examples of the method further include scaling an image of the object detection training set to obtain a scaled image, wherein the modified images include the scaled image. Some examples of the method further include combining a plurality of images from the object detection training set to obtain a combined image, wherein the modified images include the combined image. Some examples further include performing an affine transformation on the combined image to obtain a transformed image. Some examples further include cropping the transformed image to obtain a cropped image, wherein the modified images include the cropped image.

Some examples of the method further include performing object detection on images from the object tracking training set using the teacher network to obtain pseudo-labels for the object tracking training set, wherein the knowledge distillation loss is based on the pseudo-labels.

Some examples of the method further include computing first region proposal information using a region proposal network of the teacher network. Some examples further include computing second region proposal information using a region proposal network of the student network, wherein the knowledge distillation loss is based on the first region proposal information and the second region proposal information.

Some examples of the method further include computing first classification information using the region proposal network of the teacher network. Some examples further include computing second classification information using the region proposal network of the student network, wherein the knowledge distillation loss is based upon the first classification information and the second classification information.

Some examples of the method further include computing first bounding box information using a refinement network of the teacher network. Some examples further include computing second bounding box information using a refinement network of the student network, wherein the knowledge distillation loss is based on the first bounding box information and the second bounding box information.

Some examples of the method further include computing first classification information using a refinement network of the teacher network. Some examples further include computing second classification information using a refinement network of the student network, wherein the knowledge distillation loss is based upon the first classification information and the second classification information.

Some examples of the method further include computing first bounding box information for a first frame of a video using a refinement network of the student network. Some examples further include computing second bounding box information for a second frame of the video using the refinement network of the student network. Some examples further include computing a temporal consistency loss based on the first bounding box information and the second bounding box information, wherein the student network is trained based on the temporal consistency loss.

Figure 6:
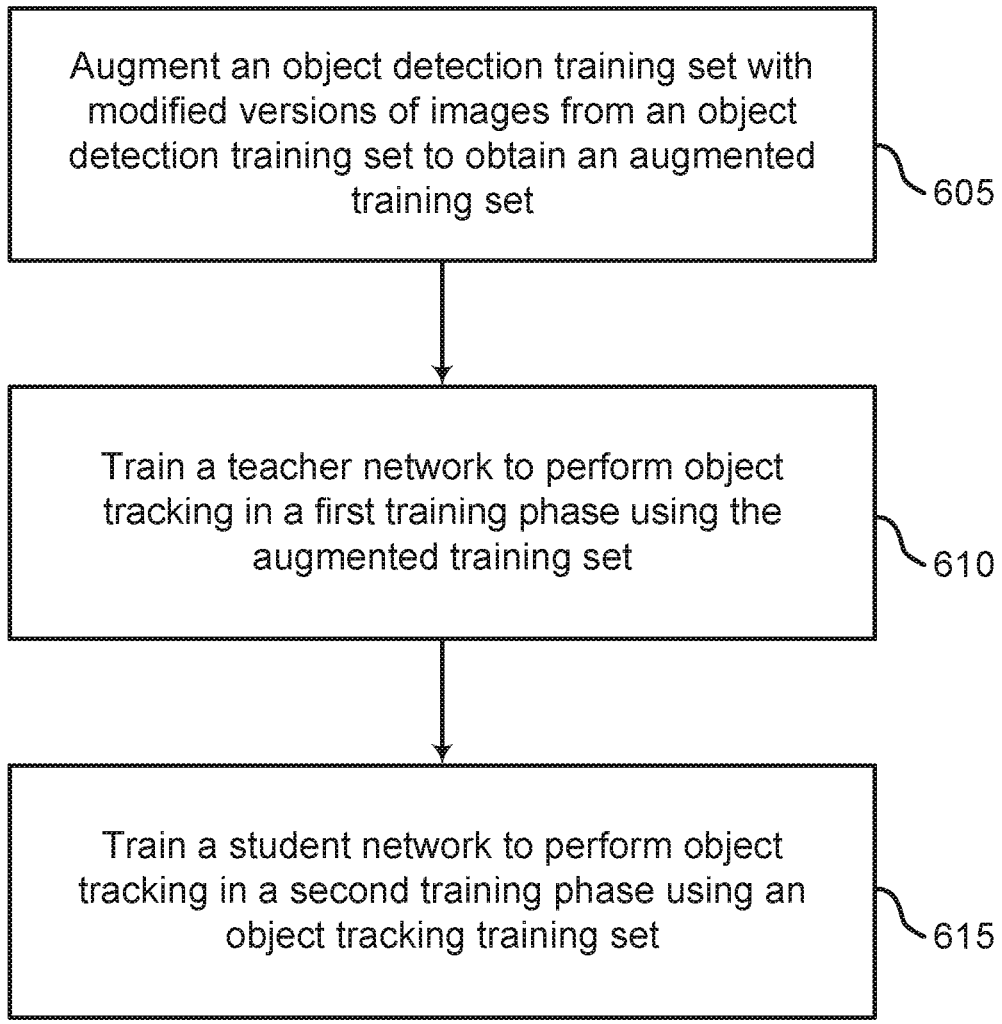
FIG. 6 shows an example training a machine learning model to perform object tracking according to aspects of the present disclosure.

FIG. 6 shows an example of training a machine learning model to perform object tracking according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, a machine learning apparatus hallucinates missing tracking supervisions in an object detection training set by generating modified versions of the original images in the object detection training set to approximate movement of objects from one frame of a video to another. Because the machine learning model knows the spatial and classification relationships between the objects in the original image and the corresponding modified image, the machine learning model is able to add tracking supervisions to the object detection training set, allowing the object detection training set to be more effectively used in training a tracking network.

Furthermore, due to fundamental difficulties in annotating videos, object detection datasets are in general bigger in dataset scale and larger in taxonomies than object tracking datasets. Therefore, in comparative examples, pre-training a machine learning model on images to acquire generic features and fine-tuning the machine learning model on videos for target domain adaptation to video tracking has become a common protocol for obtaining satisfactory performance in various video tasks. This fine-tuning approach also applies to training video trackers on large vocabulary datasets, in which a machine learning model first learns a large number of vocabulary from a large-vocabulary object detection training set, such as LVIS, and then adapts to an evaluation domain with a large-vocabulary object tracking training set, such as TAO.

In comparative examples, a naïve learning transfer approach between the object detection domain to the object tracking domain results in catastrophic forgetting, a phenomenon where a neural network forgets how to solve past tasks because of exposure to new tasks. Catastrophic forgetting occurs because the model weights that contain important information for the old task are over-written by information relevant to the new one.

To attempt to avoid catastrophic forgetting, conventional object tracking systems focus on a class incremental learning setup, in which new image classification categories are incrementally added phase-by-phase, or incremental object detection. However, referring to FIG. 6, aspects of the present disclosure instead transfer learning from the image domain to the video domain without forgetting by training a machine learning model on images that cover the entire evaluation categories included in an object detection training set and then fine-tuning the machine learning model on an object tracking dataset that may only partially cover the evaluation categories without forgetting.

At least one aspect of the present disclosure avoids forgetting by implementing a machine learning model as a student-teacher network framework that provides soft supervisions for preserving past knowledge and updates incorrect background samples, i.e., negatives, in the machine learning model to prevent seen, known objects from being interpreted as image background rather than objects, thereby retaining an ability to detect previously seen object categories while also adapting to learn from new video labels. A knowledge distillation loss may be computed based on an output of the teacher network and the student network, and the student network may be trained based on the knowledge distillation loss.

At operation 605, the system augments an object detection training set with modified versions of images from the object detection training set to obtain an augmented training set. In some cases, the operations of this step refer to, or may be performed by, a data augmentation component as described with reference to FIGS. 2, 8, and 9.

For example, an original image and a modified version of the original image with spatial jittering artifacts forms a natural input pair for training an object tracking model. In this case, because the data augmentation component knows the exact transformation relationship between the original image and the modified image, the data augmentation component is able to create object tracking annotations. In some cases, the data augmentation component assigns a same unique tracking identifier to a same object depicted in both the original image and in the modified version of the original image.

In some cases, the data augmentation component augments the object detection training set with modified versions of images from the object detection training set to obtain the augmented training set as described with reference to FIGS. 8-9. In some cases, the data augmentation component retrieves the object detection training set a database as described with reference to FIG. 1. In some cases, the data augmentation component collects the modified versions of the original images to obtain an augmented training set and stores the augmented training set in the database. In some cases, the object detection training set is a large-vocabulary dataset, such as LVIS.

At operation 610, the system trains a teacher network to perform object tracking in a first training phase using the augmented training set. In some cases, the operations of this step refer to, or may be performed by, a training component as described with reference to FIG. 2. For example, the augmented training set and the object detection training set provide pairs of input images that simulate motion of objects in a video, where an original image in the object detection training set provides a first "frame" of a video and a corresponding modified image provides a second "frame". In an embodiment, a pair of cropped images generated as described with reference to FIG. 9 provide the first and second "frames" of the simulated video. A teacher network as described with reference to FIGS. 2, 3, and 11 attempts to predict a position of a known object in the modified image based on the original image, and the training component computes a loss function that numerically describes a difference between the teacher network's prediction of the object locations in the modified image and the actual location of the objects in the modified image. Therefore, a transfer of learning between the object detection domain and the object tracking domain occurs.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration. In an example, the training component updates the parameters of the teacher network based on the loss function.

In some cases, the training component trains the teacher network to perform object detection in the first training phase. For example, the teacher network attempts to identify one or more objects in an image from the object detection training set or in the augmented training set, the training component computes a loss function that numerically describes the difference between the teacher network's prediction, and the training component updates the parameters of the teacher network based on the loss function.

At operation 615, the system trains a student network to perform object tracking in a second training phase using an object tracking training set, wherein the student network is trained based on a knowledge distillation loss that is based on an output of the student network and an output of the teacher network. In some cases, the operations of this step refer to, or may be performed by, a training component as described with reference to FIG. 2.

In some aspects, to effectively retain knowledge learned from an object detection dataset while being trained on an object tracking training set with only partially overlapping classification categories, the machine learning model is implemented as a teacher-student network framework. In some examples, the machine learning apparatus initializes the student network using parameters from the teacher network. For example, the teacher network and the student network are identical copies of each other, but the teacher network is frozen after its initial training in order to retain previous knowledge and guide the learning of the student network in a soft supervision processes. The student network can therefore adapt to the new object tracking domain with incoming video labels (via a detection loss) and also mimic the teacher network to preserve the past information via a knowledge distillation loss. In at least one aspect, the training component computes a knowledge distillation loss as described with reference to FIGS. 12-13.

According to some aspects, the training component avoids sampling anchors or region proposals that have significant intersection over union (IoU) overlaps with pseudo-labeled ground-truth boxes as background (e.g., >0.7 for RPN and >0.5 for RCNN) as described with reference to FIG. 11. In some cases, positives are only sampled based on original ground-truth labels provided in a training dataset.

According to some aspects, the machine learning model implements the student-teacher network framework as described with reference to FIG. 3 to perform transfer learning between LVIS, a large-vocabulary object detection training set, and TAO, a large-vocabulary object tracking dataset. According to some aspects, the machine learning model implements the student-teacher framework to perform transfer learning between COCO, a large-vocabulary object detection training set, and YTVIS, a large-vocabulary object tracking dataset. In this case, the number of output channels in a classifier of the trained teacher network is increased to accommodate newly added classes and the teacher detector is frozen. Second, after the student network is trained using the new weights from the object tracking training set, the machine learning apparatus unfreezes the detector of the teacher network and updates the whole weights with remaining videos in the datasets, YTVIS∩COCO, using the presented teacher-student scheme, thereby enabling new class learning and old class unforgetting at the same time.

Figure 7:
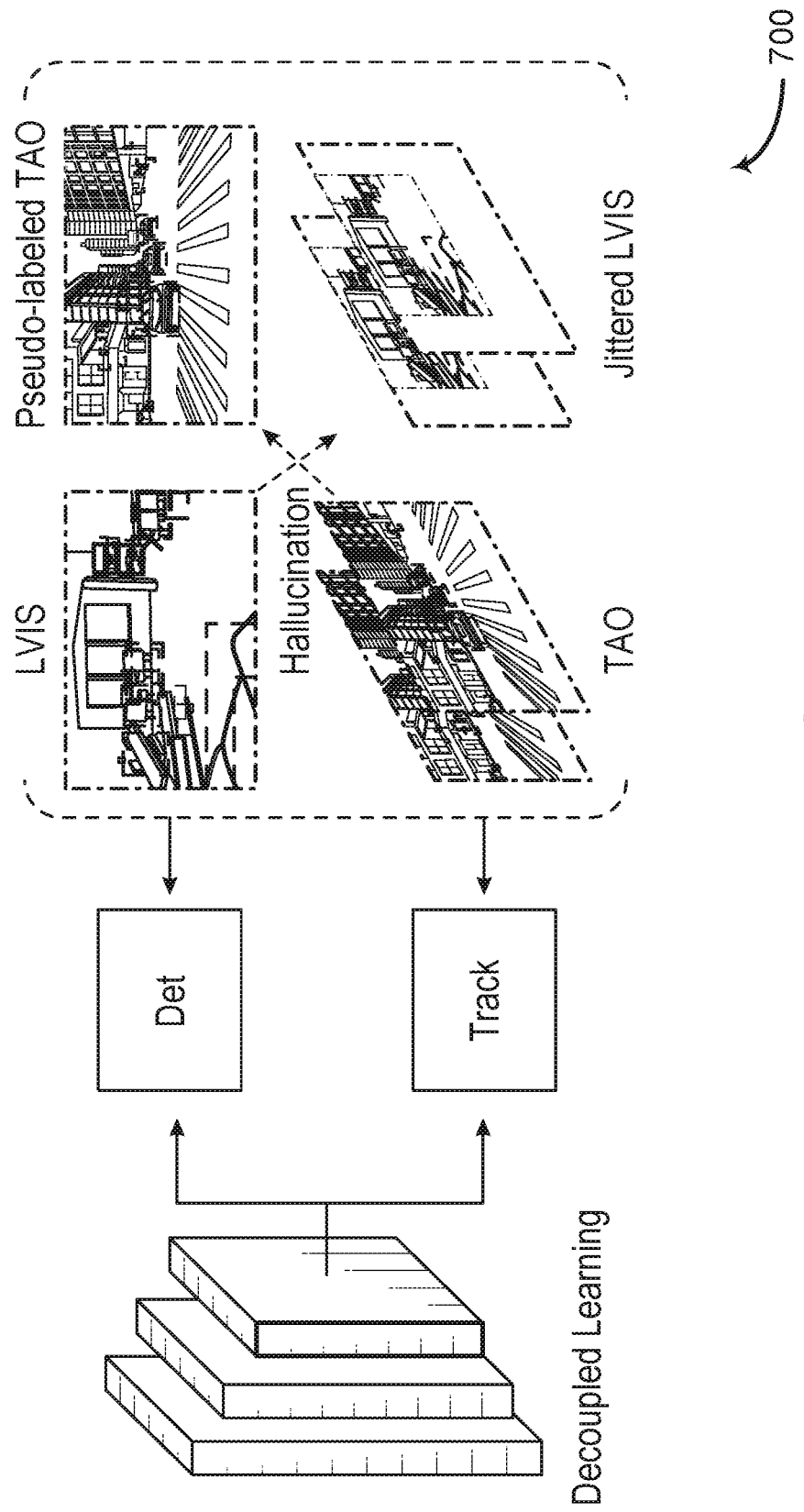
FIG. 7 shows an example of joint detection and tracking learning according to aspects of the present disclosure.

FIG. 7 shows an example of joint detection and tracking learning according to aspects of the present disclosure. Referring to FIG. 7, conventional machine learning models may use a decoupled learning paradigm in which detection and training tasks are separately and respectively learned from object detection training sets (such as LVIS) and object tracking training sets (such as TAO). Instead, according to some aspects, machine learning model 700 uses an object detection training set and an object tracking training set to jointly learn detection and training tasks so that an object tracking neural network may be trained with the greater number of classifications available in an object detection training set while avoiding the problem of catastrophic forgetting associated with using two training datasets that include partially overlapping classification labels. In some examples, the joint training is assisted by hallucinating tracking supervisions in the object detection training set as described with reference to FIGS. 8 and 9 and by a pseudo-labeled object tracking training set as described with reference to FIG. 11. Machine learning model 700 is an example of, or includes aspects of, the corresponding element described with reference to FIGS. 2 and 3.

Figure 8:
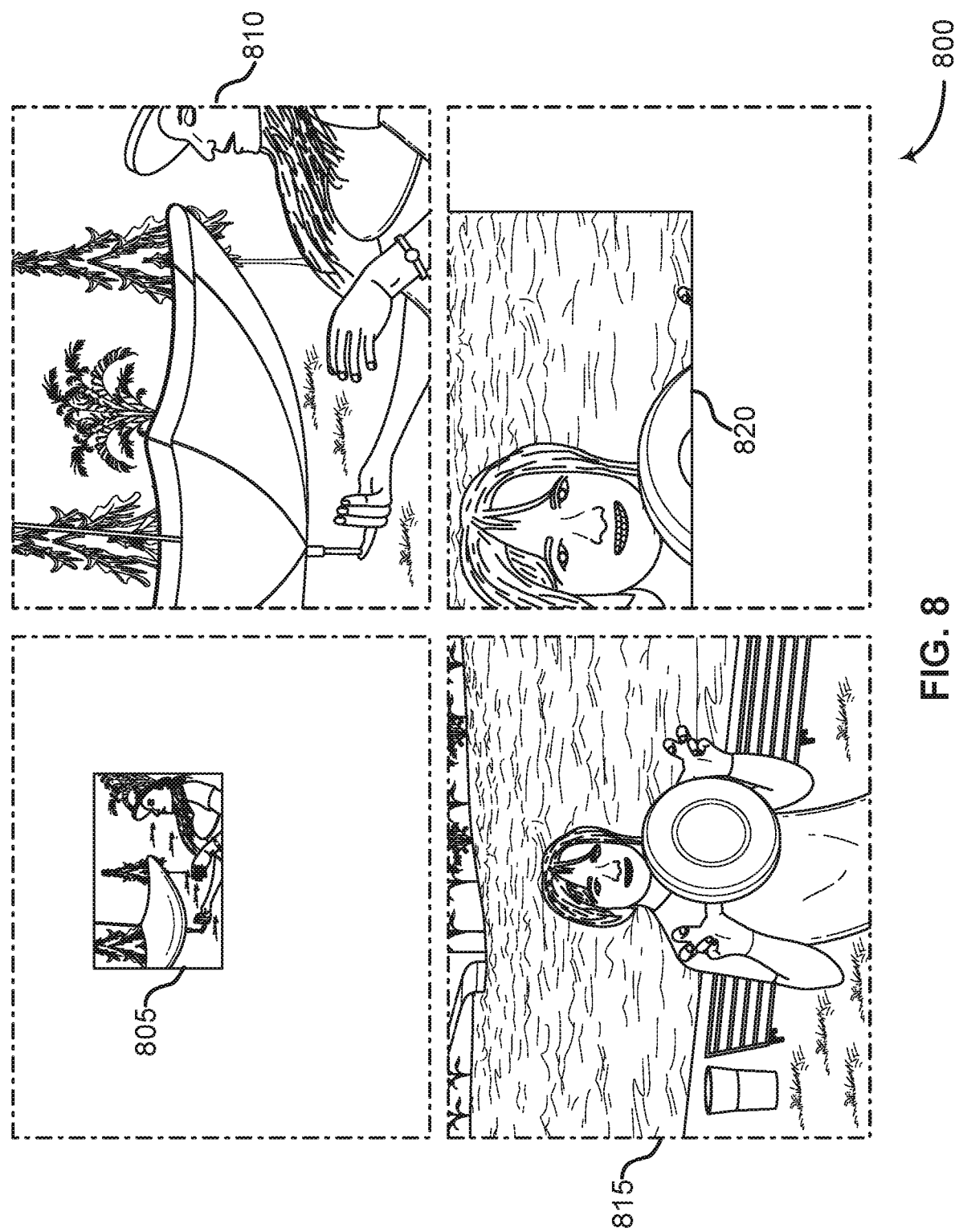
FIG. 8 shows an example of image scaling according to aspects of the present disclosure.
Figure 9:
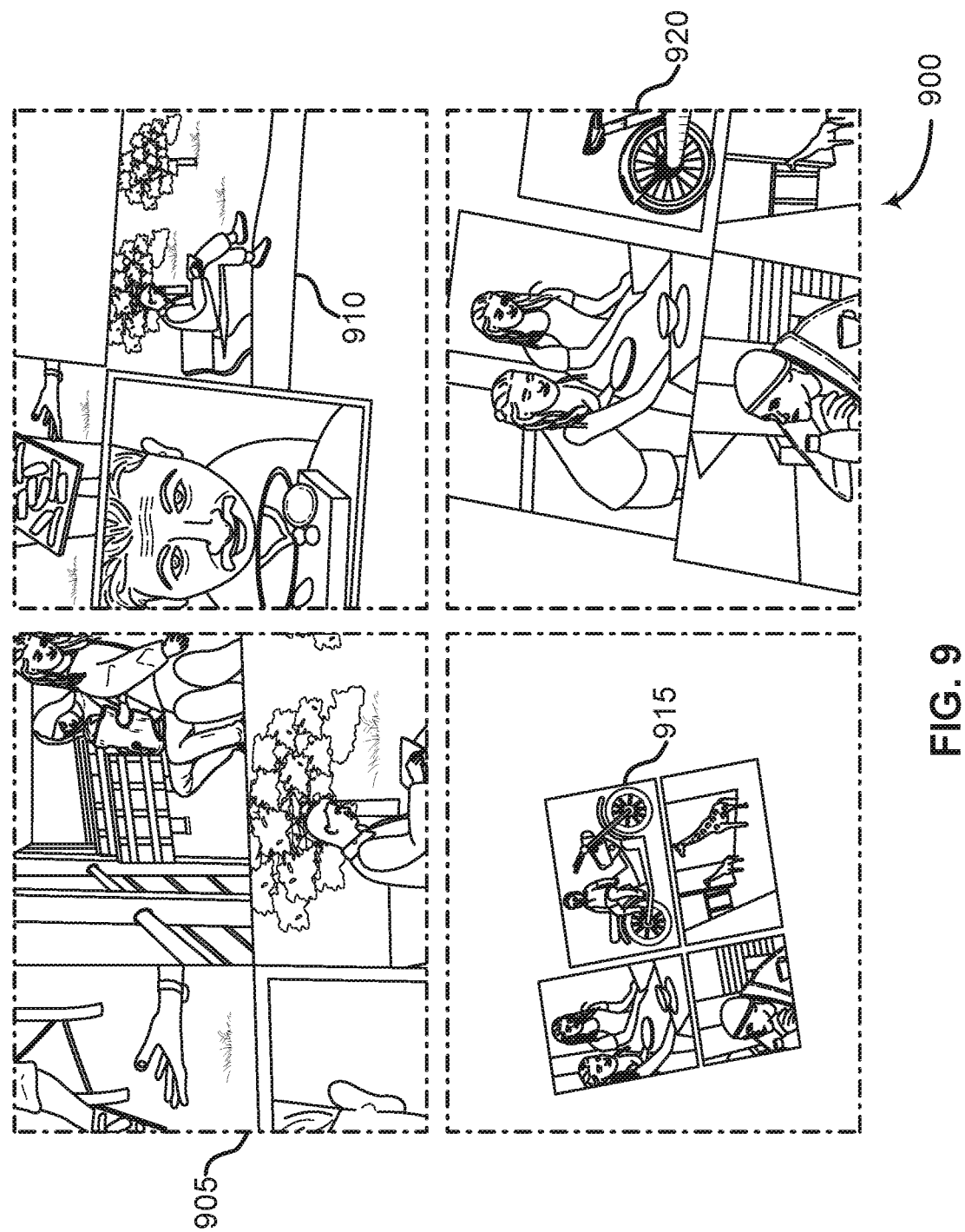
FIG. 9 shows an example of image transformation according to aspects of the present disclosure.

In FIGS. 8-9, methods for data augmentation are described. Referring to FIGS. 8-9, data augmentation components 800 and 900 augment an object detection training set with modified versions of images from an object detection training set to obtain an augmented training set that includes hallucinated tracking supervisions. FIG. 8 illustrates an example in which data augmentation component 800 generates modified versions of the images from the object detection training set by performing an image scaling process. FIG. 9 illustrates an example in which data augmentation component 900 generates modified versions of the images from the object detection training set by performing an image mosaicing process. Data augmentation component 800 is an example of, or includes aspects of, the corresponding element described with reference to FIGS. 2 and 9. Data augmentation component 900 is an example of, or includes aspects of, the corresponding element described with reference to FIGS. 2 and 8.

FIG. 8 shows an example of image scaling according to aspects of the present disclosure. Referring to FIG. 8, data augmentation component 800 scales an image of the object detection training set to obtain a scaled image, wherein the modified images include the scaled image. For example, the data augmentation component generates a modified version of original image $I_T$, $I_{T+\tau}$, by applying a scaling and cropping function to each image $I_T$ included in the object detection training set that essentially vary the scale and position of objects depicted in the image $I_T$. In some cases, the function scales an image within a range of about 0.5 to about 2 and crops the image to have a minimum intersection over union (IoU) of 0.4 with bounding boxes in the original image $I_T$ to avoid heavy object truncation and promote the use of the modified images in stably training a machine learning model for performing object tracking. "IoU" refers to a number determined by dividing the area of overlap between a ground truth bounding box and a predicted bounding box by the area of union between the ground truth bounding box and the predicted bounding box. In some cases, data augmentation component 800 stores information relating the image pair $I_T$ and $I_{T+\tau}$ in a database as described with reference to FIG. 1.

In comparative examples, conventional machine learning models adopt either random affine image transformation methods or image cropping without scaling methods, which generally provide a weak scale-jittering effect. In contrast, according to at least one embodiment, the scaling and cropping function significantly outperforms the conventional image transformation methods in providing an augmented training set.

FIG. 8 illustrates two original images 805 and 815, and two respective modified versions of the original images, 810 and 820. FIG. 8 does not illustrate the ground truth bounding box information and predicted bounding box information included in images 805-820.

FIG. 9 shows an example of image transformation according to aspects of the present disclosure. Referring to FIG. 9, data augmentation component 900 generates modified versions of the images from the object detection training set by performing an image mosaicing process by stitching randomly sampled images from the object detection training set with certain ratios in order to simulate hard, dense tracking scenarios.

In some aspects, data augmentation component 900 combines a plurality of images from the object detection training set to obtain a combined image, where the modified images include the combined image. For example, data augmentation component 900 samples four random images $\{I_a, I_b, I_b, I_d\}$ from the object detection training set to maintain class balance in the images (i.e., the number of objects depicted in the four images that are representative of different classes) and combines the randomly sampled images by stitching them together to form a combined image. In some cases, the object detection training set is a random finite set (RFS) based dataset. In some cases, data augmentation component 900 adds the cropped image to the modified images. In some cases, data augmentation component 900 stores information relating the four sampled images and the combined image in a database as described with reference to FIG. 1.

In some aspects, data augmentation component 900 performs an affine transformation on the combined image to obtain a transformed image. In some aspects, data augmentation component 900 crops the transformed image to obtain a cropped image, wherein the modified images include the cropped image. For example, data augmentation component 900 random affine and cropping functions are applied to the combined image to obtain the cropped image. In some cases, the random affine function includes large-scale jittering within a range of about 0.5 to about 2. In some cases, data augmentation component 900 adds the cropped image to the modified images. In some cases, data augmentation component 900 stores information relating the four sampled images, the combined image, the transformed image, and the cropped image in a database as described with reference to FIG. 1

In some examples, data augmentation component 900 creates an input tracking pair by applying the mosaicing process (e.g., combining sampled images and performing affine and cropping functions on the combined image) on the randomly sampled images twice. That is, a first mosaicing iteration performed on a set of sampled images creates a first modified image, and a second mosaicing iteration performed on the set of sampled images creates a second modified image, and data augmentation component 900 determines tracking information by comparing the second modified image and the first modified image.

FIG. 9 illustrates four cropped images 905-920. FIG. 9 does not illustrate the ground truth bounding box information and predicted bounding box information included in cropped images 905-920. In some aspects, by performing the mosaicing operations of FIG. 9, a machine learning apparatus as described with reference to FIG. 2 simulates a dense tracking scenario that naturally occurs at test time for a large vocabulary tracker, as a large vocabulary tracker infers a large number of bounding boxes to cover the label vocabularies included in a tracking training set. Furthermore, by performing the mosaicing operations of FIG. 9, a machine learning apparatus as described with reference to FIG. 2 generates images that include increased foreground objects, which results in increased negatives for each object, allowing for a more discriminative learning of tracking. Still further, the mosaicing operations of FIG. 9 increases label correspondences, allowing a tracking head of a machine learning model of the machine learning apparatus to ingest more supervisions per image.

Figure 10:
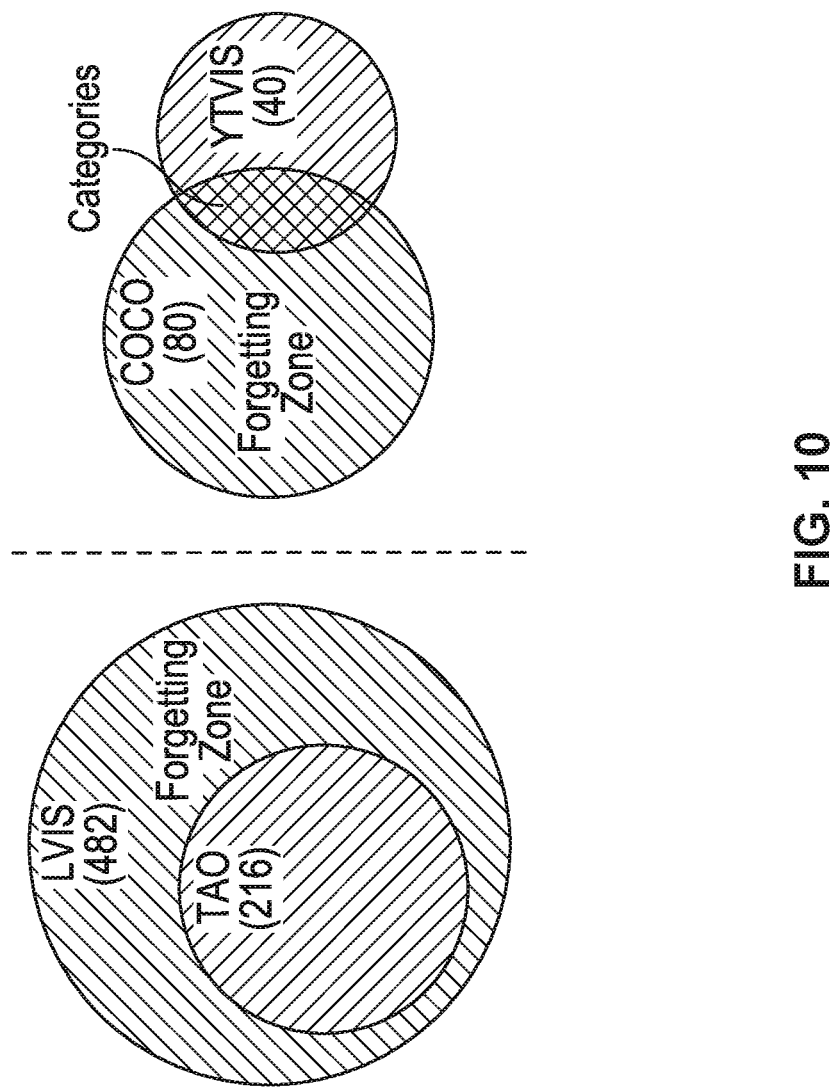
FIG. 10 shows an example of relationships of image datasets and video datasets according to aspects of the present disclosure.

FIG. 10 shows relationships between example image datasets and video datasets according to aspects of the present disclosure. In more detail, FIG. 10 shows an overlap in vocabularies (number of object classes) included in object detection datasets (such as LVIS and COCO) and object tracking datasets (such as TAO and YTVIS), and the "Forgetting Zone" in which catastrophic forgetting may occur when the two datasets with incompletely overlapping object categories are used for transfer learning. Referring to FIG. 10, according to some aspects, the object detection training set includes one or more object categories that are not included in the object tracking training set.

Figure 11:
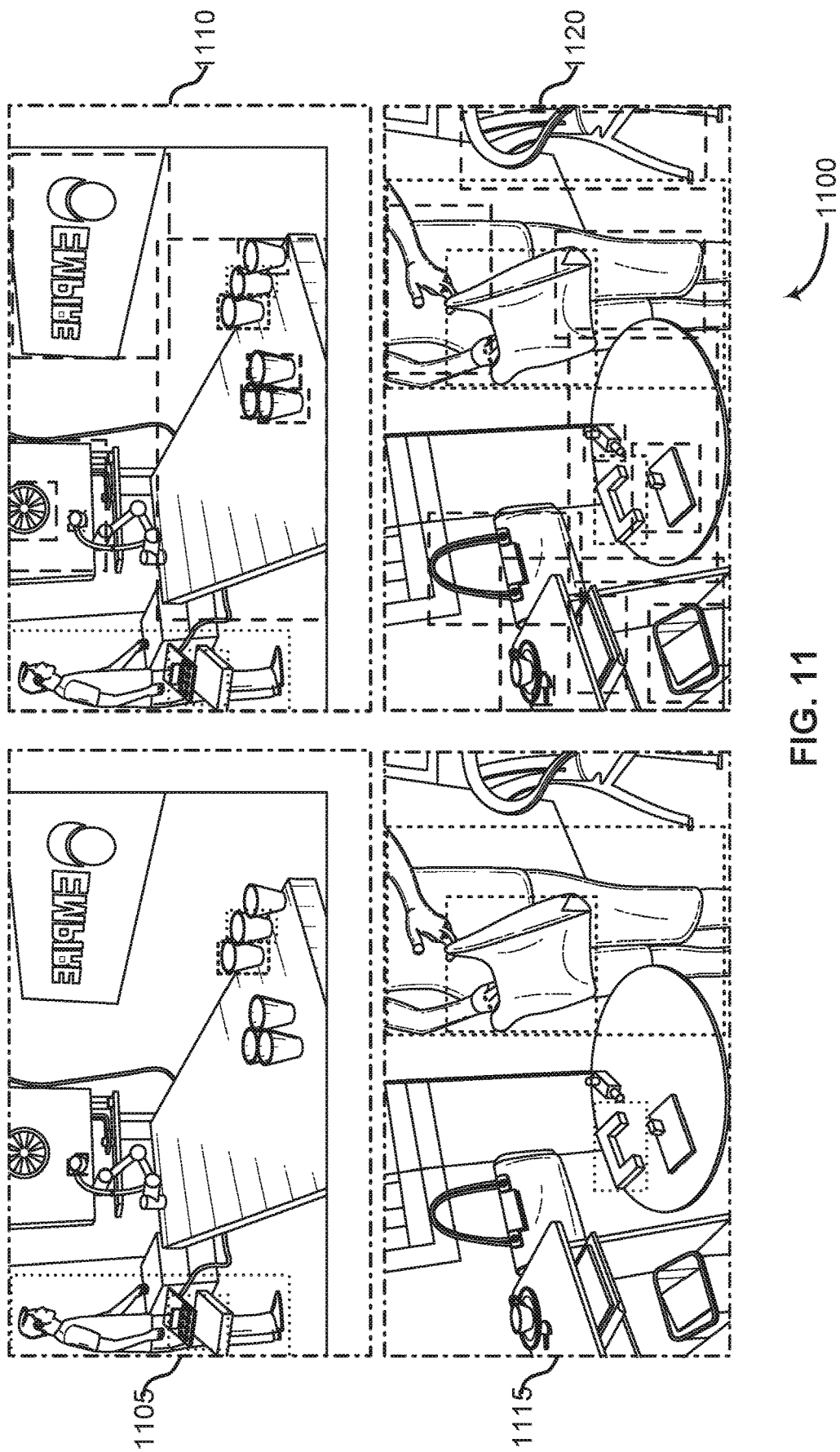
FIG. 11 shows an example of pseudo-labeling according to aspects of the present disclosure.

FIG. 11 shows an example of pseudo-labeling according to aspects of the present disclosure. Referring to FIG. 11, in a comparative example, catastrophic forgetting may occur when a neural network "sees" an object in an object tracking training dataset that is classified in a known object category during image-to-video transfer learning, but the object tracking training dataset is missing an annotation for the object category. As the category is not annotated, detection supervision cannot be provided for the neural network, and the neural network cannot be prevented from treating the object as background, rather than an object, thereby perturbing pre-trained classifier boundaries of the neural network, leading to catastrophic forgetting.

To help avoid catastrophic forgetting, in at least one embodiment, teacher network 1100 performs object detection on images from the object tracking training set to obtain pseudo-labels for the object tracking training set. For example, teacher network 1100 fills in annotations that are present in the object detection training set but are missing in the object tracking training set by pseudo-labeling input images from the object tracking training set. Pseudo-labeling refers to a process of training a neural network on a batch of labeled data, using the neural network to predict pseudo-labels on a batch of unlabeled data, using the predicted labels to calculate a loss on the unlabeled data, combining the labeled loss and the unlabeled loss, and backpropagating the combined loss to the neural network to update the parameters of the neural network.

In at least one embodiment, a training component as described with reference to FIG. 2 trains teacher network 1100 to predict pseudo-labels for unlabeled data in the object tracking training set. Referring to FIG. 11, teacher network 1100 predicts pseudo-labels for example images from the object tracking training set 1105 and 1115 to obtain pseudo-labeled images 1110 and 1120. The original labels are illustrated by the dotted lines in example images 1105 and 1115, and the pseudo-labels are illustrated by the added dotted lines in example images 1110 and 1120. In at least one embodiment, the teacher network obtains pseudo-labels for the object tracking training set with a threshold of 0.3. In at least one embodiment, teacher network 1100 filters out redundant pseudo-labels that highly overlap with labels present in the object tracking training set. Teacher network 1100 is an example of, or includes aspects of, the corresponding element described with reference to FIGS. 2 and 3.

Figure 12:
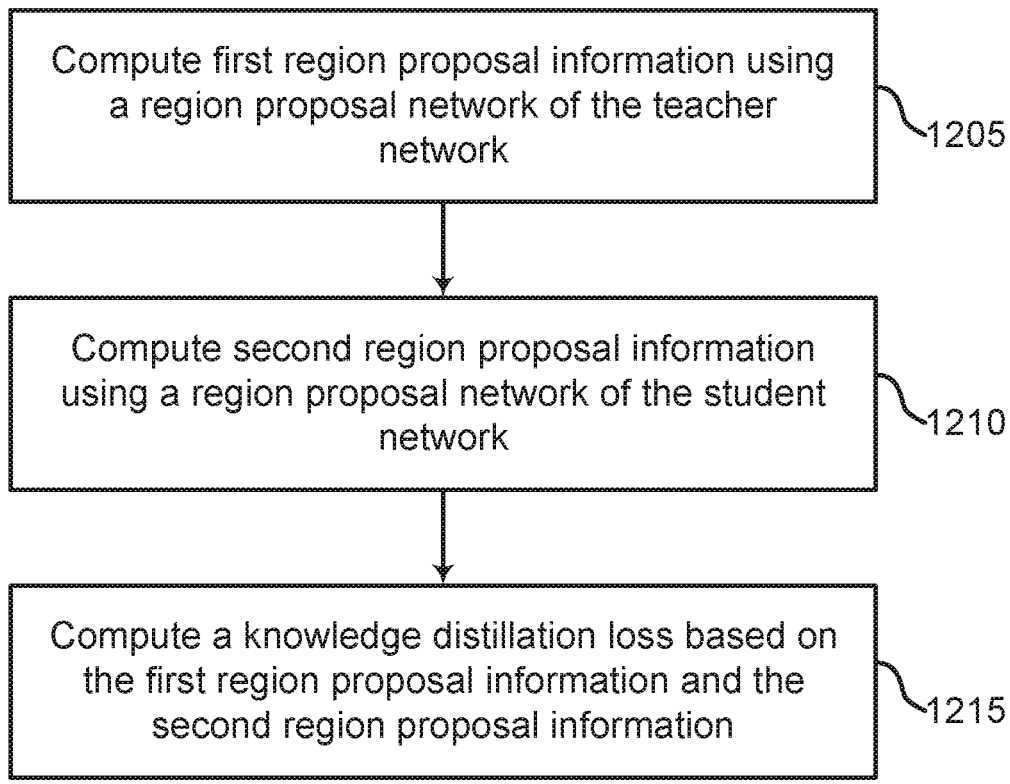
FIG. 12 shows an example of computing a knowledge distillation loss using region proposal networks according to aspects of the present disclosure.

FIG. 12 shows an example of computing a knowledge distillation loss using region proposal networks according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, according to some aspects, the knowledge distillation loss focuses on preventing catastrophic forgetting in a detector head of the student network, as a tracking head of the student network is trained in a category-agnostic manner.

At operation 1205, the system computes first region proposal information using a region proposal network of the teacher network. According to some aspects, the system computes first classification information using the region proposal network of the teacher network. In some cases, the operations of this step refer to, or may be performed by, a teacher network as described with reference to FIGS. 2, 3, and 11. In an example, a feature pyramid network of the teacher network receives an image included the object tracking training set as input and outputs a feature map including image features from each level of the feature pyramid network. A region proposal network of the teacher network receives the feature map as an input and predicts region proposal information for the image that includes object bounds for the image and objectness scores at each position. An objectness score measures how well a detector network identifies locations and classes of objects during detection. Each feature map goes through a convolution layer followed by two separate layers, one for objectness classification and one for proposal regression.

At operation 1210, the system computes second region proposal information using a region proposal network of the student network. According to some aspects, the system computes second classification information using the region proposal network of the student network. In some cases, the operations of this step refer to, or may be performed by, a student network as described with reference to FIGS. 2 and 3. In an example, a feature pyramid network of the student network receives an image included the object tracking training set as input and outputs a feature map including image features from each level of the feature pyramid network. A region proposal network of the student network receives the feature map as an input and predicts region proposal information for the image that includes object bounds for the image and objectness scores at each position. Each feature map goes through a convolution layer followed by two separate layers, one for objectness classification and one for proposal regression.

At operation 1215, the system computes a knowledge distillation loss based on the first region proposal information and the second region proposal information. According to some aspects, the system computes a knowledge distillation loss based on the first classification information and the second classification information. According to some aspects, the system trains the student network to perform object detection in a second training phase. In some cases, the operations of this step refer to, or may be performed by, a training component as described with reference to FIG. 2. For example, the training component collects the outputs of the region proposal networks of the teacher network and the student network to compute the knowledge distillation loss:

$$L_{dist}^{RPN} = \frac{1}{N_{cls}}\sum_{i=1} L_{cls}(u_i, u_i^*) + \frac{1}{N_{reg}}\sum_{i=1} L_{reg}(v_i, v_i^*) \quad (1)$$

where i is the index of an anchor, $u_i$ and $u^*_i$ are the mean subtracted objectness logits obtained from the student and the teacher, respectively, $v_i$ and $v^*_i$ are four parameterized coordinates for the anchor refinement obtained from the student and teacher, respectively, and $L_{cls}$ and $L_{reg}$ are mean-squared error (MSE) loss and smooth L1 loss, respectively. In at least one embodiment, $N_{cls}(=256)$ and keg are an effective number of anchors for normalization.

In at least one embodiment, the knowledge distillation loss is based on the pseudo labels. For example, $L_{reg}$ is only computed for positive anchors that have an IoU larger than 0.7 with the pseudo-labeled ground-truth boxes. In at least one embodiment, the training component trains the student network by backpropagating the knowledge distillation loss to the student network.

Figure 13:
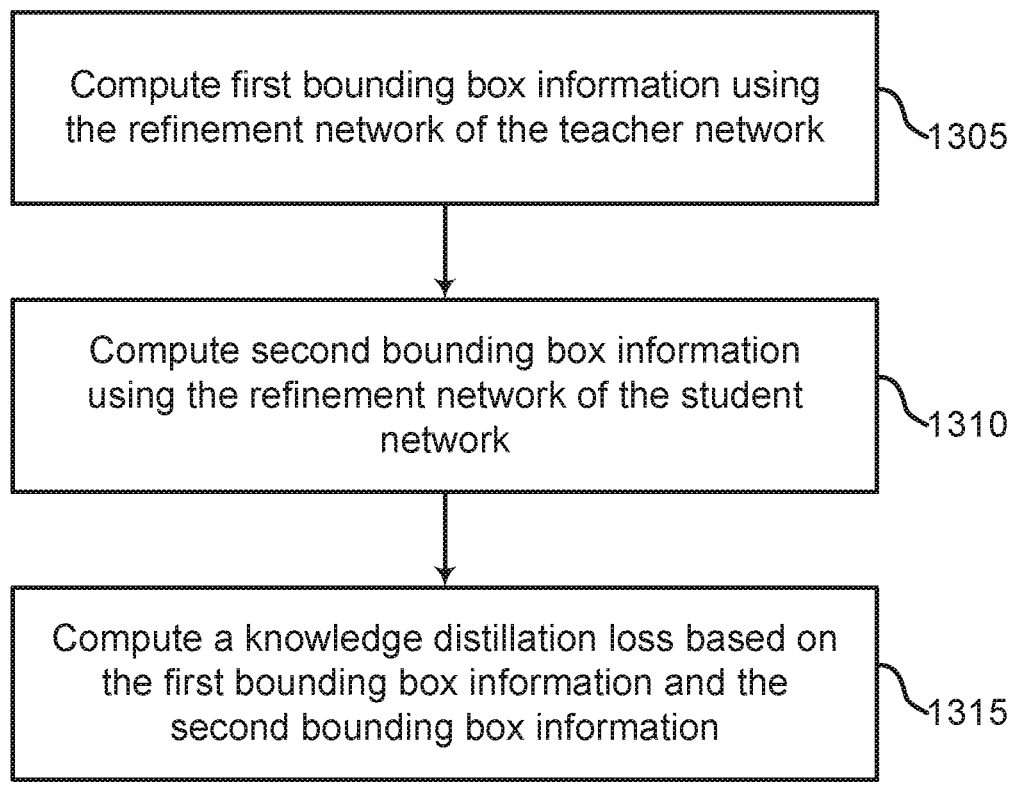
FIG. 13 shows an example of computing a knowledge distillation loss using refinement networks according to aspects of the present disclosure.

FIG. 13 shows an example of computing a knowledge distillation using refinement networks according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, the knowledge distillation loss focuses on preventing catastrophic forgetting in a detector head of the student network, as a tracking head of the student network is trained in a category-agnostic manner.

At operation 1305, the system computes first bounding box information using the refinement network of the teacher network. According to some aspects, the system computes first classification information using the refinement network of the teacher network. In some cases, the operations of this step refer to, or may be performed by, a teacher network as described with reference to FIGS. 2, 3, and 11. For example, the refinement network of the teacher network takes the top-scoring proposals from region proposals output by a region proposal network of the teacher network as described with reference to FIG. 12 and performs RoI pooling to extract region features from each pyramid level of the feature pyramid network of the teacher network. The refinement network then linearizes the respective input region features and feeds the linearized region features through two FC layers and the two separate FC layers to output a softmax classification and a bounding box regression. This output may include the input image overlayed with bounding boxes that identify regions of classified objects in the image, a label for each bounding box describing the classification of the object in the bounding box, and a threshold for the classification label.

At operation 1310, the system second bounding box information using the refinement network of the student network. According to some aspects, the system computes second classification information using the refinement network of the student network. In some cases, the operations of this step refer to, or may be performed by, a student network as described with reference to FIGS. 2 and 3. For example, the refinement network of the student network takes the top-scoring proposals from region proposals output by a region proposal network of the student network as described with reference to FIG. 12 and performs RoI pooling to extract region features from each pyramid level of the feature pyramid network of the student network. The refinement network then linearizes the respective input region features and feeds the linearized region features through two FC layers and the two separate FC layers to output a softmax classification and a bounding box regression. This output may include the input image overlayed with bounding boxes that identify regions of classified objects in the image, a label for each bounding box describing the classification of the object in the bounding box, and a threshold for the classification label.

At operation 1315, the system computes a knowledge distillation loss based on the first bounding box information and the second bounding box information. According to some aspects, the system computes a knowledge distillation loss based on the first classification information and the second classification information. According to some aspects, the system trains the student network to perform object detection in a second training phase. In some cases, the operations of this step refer to, or may be performed by, a training component as described with reference to FIG. 2. For example, the training component collects outputs of the refinement networks of the teacher network and the student network to compute a knowledge distillation loss:

$$L_{dist}^{RCNN} = \frac{1}{M_{cls}}\sum_{j=1}L_{cls}(p_j, p_j^*) + \frac{1}{M_{reg}}\sum_{j=1}L_{reg}(t_j, t_j^*) \quad (2)$$

where j is the index of a proposal, $p_j$ and $p^*_j$ are the mean subtracted classification logits obtained from the student network and the teacher network, respectively, $t_j$ and $t^*_j$ are four parameterized coordinates for the proposal refinement obtained from the student network and the teacher network, respectively, and $L_{cls}$ and $L_{reg}$ are MSE loss and smooth L1 loss, respectively.

In at least one embodiment, the knowledge distillation loss is based on the pseudo labels. For example, $L_{reg}$ is only imposed for positive proposals that have an IoU larger than 0.5 with the pseudo-labeled ground-truth bounding boxes. According to some aspects, $M_{cls}$=512 and $M_{reg}$ are an effective number of proposals for normalization. In at least one embodiment, the training component trains the student network by backpropagating the knowledge distillation loss to the student network.

Figure 14:
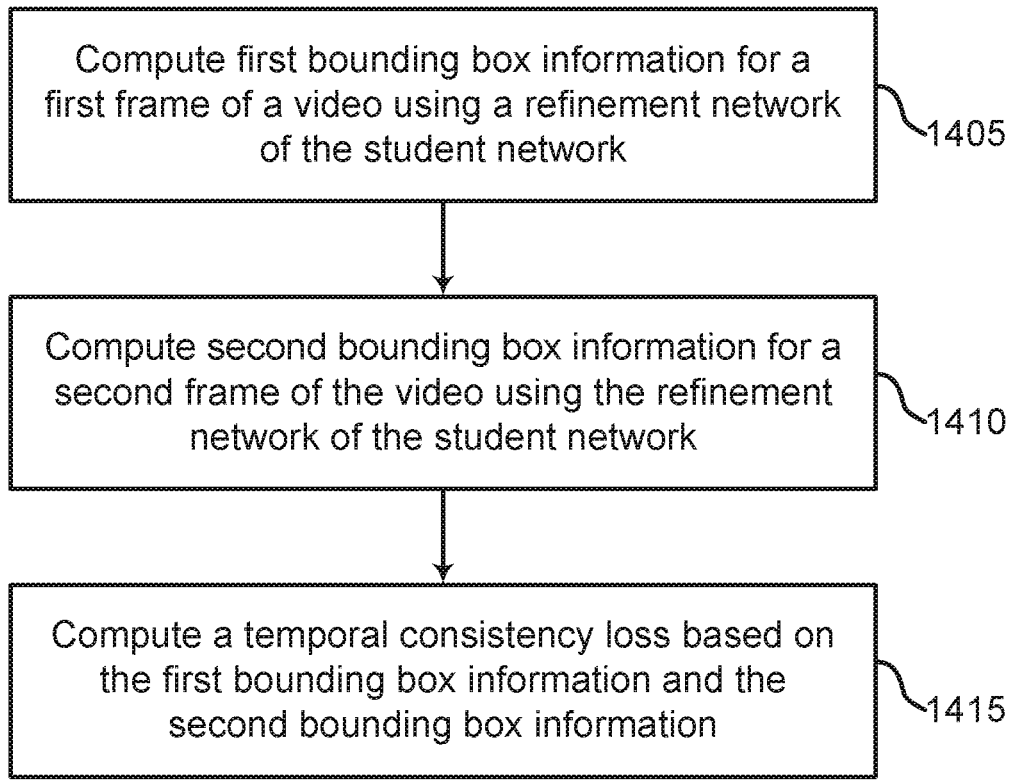
FIG. 14 shows an example of computing a temporal consistency loss according to aspects of the present disclosure.

FIG. 14 shows an example of computing a temporal consistency loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 14, a common tracking failure in conventional large-vocabulary tracking models is caused by semantic flickering of bounding boxes between similar object categories. To mitigate semantic flickering, at least one embodiment regularizes the machine learning model during training with a temporal consistency loss that enforces outputs of the machine learning model for corresponding pixels (or patches) in video frames to be consistent. In conventional tracking models, a temporal consistency loss may be used in video processing tasks to ensure the output temporal smoothness at a pixel level. However, the temporal consistency loss according to at least one embodiment extends this idea from pixels to instances, where class predictions of the same instances in two different frames are forced to be equivalent.

At operation 1405, the system computes first bounding box information for a first frame of a video using a refinement network of the student network. In some cases, the operations of this step refer to, or may be performed by, a student network as described with reference to FIGS. 2 and 3. For example, the student network computes bounding box information for objects in a frame $I_t$ of an object tracking training set, or in an image $I_t$ from an object detection training set $I_t$.

At operation 1410, the system computes second bounding box information for a second frame of the video using the refinement network of the student network. In some cases, the operations of this step refer to, or may be performed by, a student network as described with reference to FIGS. 2 and 3. For example, the student network computes bounding box information for objects in a subsequent frame $I_{t+\tau}$ of an object tracking training set or a modified version $I_{t+\tau}$ of the image $I_t$ in the object detection training set as described with reference to FIGS. 8-9 that simulates an object tracking training set.

At operation 1415, the system computes a temporal consistency loss based on the first bounding box information and the second bounding box information, wherein the student network is trained based on the temporal consistency loss. In some cases, the operations of this step refer to, or may be performed by, a training component as described with reference to FIG. 2. For example, the training component forwards ground-truth bounding boxes of the same instance in two different frames or images $I_t$ and $I_{t+\tau}$ to the refinement network of the student network. The training component uses mean subtracted classification logits, p, for consistency regularization, and the training component calculates the temporal consistency loss:

$$L_{reg} = |p^t - p^{t+\tau}|_2 \quad (3)$$

where $p^t$ and $p^{t+\tau}$ denote the logits of the same instance in two different frames, $I_t$ and $I_{t+\tau}$. In at least one embodiment, the training component trains the student network by backpropagating the temporal consistency loss to the student network.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for object tracking, comprising:
augmenting an object detection training set with modified versions of images from the object detection training set to obtain an augmented training set;
training a teacher network to perform an object detection training task and an object tracking training task in a first training phase, wherein the teacher network is trained to perform the object detection training task using the object detection training set and to perform the object tracking training task using the augmented training set, and wherein the object detection training task comprises a different training task from the object tracking training task; and
training a student network to in a second training phase using an object tracking training set, wherein the student network is trained based on a knowledge distillation loss that is based on an output of the student network and an output of the teacher network, and wherein the object tracking information includes classification information that categorizes the object according to a category that is not labeled in the object tracking training set.

2. The method of claim 1, further comprising:
training the student network to perform object detection in the second training phase.

3. The method of claim 1, further comprising:
scaling an image of the object detection training set to obtain a scaled image, wherein the modified images include the scaled image.

4. The method of claim 1, further comprising:
combining a plurality of images from the object detection training set to obtain a combined image, wherein the modified images include the combined image;
performing an affine transformation on the combined image to obtain a transformed image; and
cropping the transformed image to obtain a cropped image, wherein the modified images include the cropped image.

5. The method of claim 1, further comprising:
performing object detection on images from the object tracking training set using the teacher network to obtain pseudo-labels for the object tracking training set, wherein the knowledge distillation loss is based on the pseudo-labels.

6. The method of claim 1, further comprising:
computing first region proposal information using a region proposal network of the teacher network; and
computing second region proposal information using a region proposal network of the student network, wherein the knowledge distillation loss is based on the first region proposal information and the second region proposal information.

7. The method of claim 6, further comprising:
computing first classification information using the region proposal network of the teacher network; and
computing second classification information using the region proposal network of the student network, wherein the knowledge distillation loss is based upon the first classification information and the second classification information.

8. The method of claim 6, further comprising:
computing first bounding box information using a refinement network of the teacher network; and
computing second bounding box information using a refinement network of the student network, wherein the knowledge distillation loss is based on the first bounding box information and the second bounding box information.

9. The method of claim 8, further comprising:
computing first classification information using a refinement network of the teacher network; and
computing second classification information using a refinement network of the student network, wherein the knowledge distillation loss is based upon the first classification information and the second classification information.

10. The method of claim 1, further comprising:
computing first bounding box information for a first frame of a video using a refinement network of the student network;
computing second bounding box information for a second frame of the video using the refinement network of the student network; and
computing a temporal consistency loss based on the first bounding box information and the second bounding box information, wherein the student network is trained based on the temporal consistency loss.

11. The method of claim 1, further comprising:
initializing the student network using parameters from the teacher network.

12. The method of claim 1, wherein:
the object detection training set includes one or more object categories that are not included in the object tracking training set.

13. A method for object tracking, comprising:
receiving a video depicting an object;
generating object tracking information for the object using a student network, wherein the student network is trained in a second training phase based on a teacher network using an object tracking training set and a knowledge distillation loss that is based on an output of the student network and the teacher network, wherein the teacher network is trained in a first training phase to perform an object detection training task using an object detection training set and to perform an object tracking training task using the object detection training set augmented with object tracking supervision data, and wherein the object detection training task comprises a different training task from the object tracking training task, and wherein the object tracking information includes classification information that categorizes the object according to a category that is not labeled in the object tracking training set; and
transmitting the object tracking information in response to receiving the video.

14. An apparatus for object tracking, comprising:
a data augmentation component configured to augment an object detection training set with modified images from the object detection training set to obtain an augmented training set;
a teacher network trained to perform an object detection training task in a first training phase using the object detection training set and to perform an object tracking training task in the first training phase using the augmented training set, wherein the object detection training task comprises a different training task from the object tracking training task; and
a student network trained to generate object tracking information for an object depicted in an image in a second training phase using an object tracking training set, wherein the student network is trained based on a knowledge distillation loss that is based on an output of the student network and an output of the teacher network, and wherein the object tracking information includes classification information that categorizes the object according to a category that is not labeled in the object tracking training set.

15. The apparatus of claim 14, further comprising:
a training component configured to train the teacher network and the student network.

16. The apparatus of claim 14, wherein:
the data augmentation component is configured to augment the object tracking training set based on pseudo-labels generated by the teacher network.

17. The apparatus of claim 14, wherein:
the teacher network and the student network each include a feature pyramid network, a region proposal network, and a refinement network.

18. The apparatus of claim 17, wherein:
the refinement network includes an RCNN.

* * * * *